(12) United States Patent
Terao

(10) Patent No.: US 9,015,280 B2
(45) Date of Patent: Apr. 21, 2015

(54) COMMUNICATION TERMINAL, ADDRESS RESOLUTION SERVER, AND COMPUTER PROGRAM

(75) Inventor: Kyoichi Terao, Tokyo (JP)

(73) Assignee: Pioneer Corporation, Kanagawa (JP)

( * ) Notice: Subject to any disclaimer, the term of this patent is extended or adjusted under 35 U.S.C. 154(b) by 659 days.

(21) Appl. No.: 13/376,470

(22) PCT Filed: Jun. 10, 2009

(86) PCT No.: PCT/JP2009/060614
§ 371 (c)(1),
(2), (4) Date: Dec. 6, 2011

(87) PCT Pub. No.: WO2010/143286
PCT Pub. Date: Dec. 16, 2010

(65) Prior Publication Data
US 2012/0084442 A1  Apr. 5, 2012

(51) Int. Cl.
*H04L 29/12* (2006.01)
*H04L 12/701* (2013.01)

(52) U.S. Cl.
CPC .... *H04L 29/12066* (2013.01); *H04L 29/12028* (2013.01); *H04L 29/12424* (2013.01); *H04L 29/12509* (2013.01); *H04L 29/12547* (2013.01); *H04L 45/00* (2013.01); *H04L 61/103* (2013.01); *H04L 61/1511* (2013.01); *H04L 61/2535* (2013.01); *H04L 61/2567* (2013.01); *H04L 61/2582* (2013.01)

(58) Field of Classification Search
None
See application file for complete search history.

(56) References Cited

U.S. PATENT DOCUMENTS

2004/0264385 A1* 12/2004 Hennessey et al. ........... 370/252

FOREIGN PATENT DOCUMENTS

| JP | 2001-320418 | 11/2001 |
|----|-------------|---------|
| JP | 2003-188901 | 7/2003 |
| JP | 2003-283570 | 10/2003 |
| JP | 2006-261867 | 9/2006 |
| JP | 2007-074172 | 3/2007 |

OTHER PUBLICATIONS

International Search Report, PCT/JP2009/060614, Aug. 25, 2009.

* cited by examiner

*Primary Examiner* — Scott B Christensen
(74) *Attorney, Agent, or Firm* — Young & Thompson

(57) ABSTRACT

A communication terminal (100c) is provided with: an obtaining device (101) for presenting the host name of the another end terminal (100d) to an address resolution server (200), thereby obtaining a second address bundle (221) indicating a network route from a global network (401), to which the address resolution server belongs, to the another end terminal; a recognizing device (102) for recognizing a positional relation on the network between the communication terminal and the another end terminal, on the basis of the second address bundle and a first address bundle (221) indicating a network route from the global network, to which the address resolution server belongs, to the communication terminal; and a determining device (103) for determining a host address which is used for the communication with the another end terminal from among the second address bundle, on the basis of the recognized positional relation.

17 Claims, 10 Drawing Sheets

| Host name | 221: Address bundle |
|---|---|
| A | 98.76.54.32:55555 |
| B | 123.45.67.89:40000-192.168.0.3:54321 |
| C | 123.45.67.89:40001-192.168.0.2:44444-192.168.1.99:54321 |
| D | 123.45.67.89:40002-192.168.0.2:44445-192.168.1.100:54321 |
| E | 123.45.67.89:40003-192.168.0.9:33333-192.168.1.100:54321 |
| ⋮ | ⋮ |

| Host name | 221: Address bundle |
|---|---|
| A | 98.76.54.32:55555 [00:11:22:33:44:aa] |
| B | 123.45.67.89:40000-192.168.0.3:54321 [00:11:22:33:44:bb] |
| C | 123.45.67.89:40001-192.168.0.2:44444-192.168.1.99:54321 [00:11:22:33:44:cc] |
| D | 123.45.67.89:40002-192.168.0.2:44445-192.168.1.100:54321 [00:11:22:33:44:dd] |
| E | 123.45.67.89:40003-192.168.0.9:33333-192.168.1.100:54321 [00:11:22:33:44:ee] |
| ⋮ | ⋮ |

(a)

220

| Host name | 221: Address bundle |
|---|---|
| A | 98.76.54.32:55555 [00:11:22:33:44:aa] |
| B | 123.45.67.89:40000-192.168.0.3:54321 [00:11:22:33:44:bb] |
| C | 123.45.67.89:40001-(192.168.1.1)-192.168.1.99:54321 [00:11:22:33:44:cc] |
| D | 123.45.67.89:40002-(192.168.1.1)-192.168.1.100:54321 [00:11:22:33:44:dd] |
| E | 123.45.67.89:40003-192.168.0.9:33333-192.168.1.100:54321 [00:11:22:33:44:ee] |
| ⋮ | ⋮ |

(b)

COMMUNICATION TERMINAL, ADDRESS RESOLUTION SERVER, AND COMPUTER PROGRAM

TECHNICAL FIELD

The present invention relates to, for example, a communication terminal for communicating with another end terminal and particularly for communicating with another end terminal which belongs to the same network as a network to which the communication terminal belongs or which belongs to another network directly or indirectly connected via a router to the network to which the communication terminal belongs. The present invention relates to, for example, an address resolution server for notifying control information (e.g. a host address, etc.) which is necessary to communicate with another end terminal to the communication terminal, and a computer program for making a computer function as the communication terminal or the address resolution server.

BACKGROUND ART

For example, if a communication terminal and another end terminal use TCP/IP to make communication, an IP address is used as an address for identifying the communication terminal which is a transmission source or another end terminal which is a transmission destination. In this case, in particular, in order to make it easy to identify the communication terminal and another end terminal, there is known a method in which unique host names are assigned to the communication terminal and another end terminal and in which the host names are used to make communication (e.g. refer to patent documents 1 and 2). Specifically, for example, when the communication terminal uses the host name of another end terminal to communicate with another end terminal, a Domain Name System (DNS) server converts the host name of another end terminal to the IP address of another end terminal, and notifies the converted IP address of another end terminal to the communication terminal. Then, the communication terminal specifies the converted IP address of another end terminal as a destination address, thereby communicating with another end terminal. This makes it possible for a user of the communication terminal to communicate with another end terminal by using only the host name which is relatively easy for the user to identify.

By the way, as the IP address, there are a global address and a local address. The global address is a globally unique address. On the other hand, the local address is an address determined uniquely in a particular communication network. Moreover, a general network has a hierarchy network configuration in which a plurality of local networks using the local addresses exist in the global network using the global address. In this case, the communication using the host name described above may have the following technical problem.

Specifically, the following example is considered; namely, a "terminal A" accesses a "server A" by using the host name in such a network configuration that a local network including the "server A" with a local address of "10.0.0.123" and a host name of "AA" and the "terminal A" with a local address of "10.0.0.30" is connected to the global network via a Network Address Translation (NAT) router with a LAN side address (i.e. local address) of "10.0.0.1" and a WAN side address (i.e. global address) of "123.45.67.89" and that a DNS server with a global address of "141.140.139.138" is disposed in the global network. In this case, the "terminal A" presents the host name "AA" to access the DNS server, thereby obtaining from the DNS server an IP address for accessing the "server A". In this case, since the DNS server merely performs the conversion from the host name to the global address, the DNS server notifies the "terminal A" of "123.45.67.89" which is the WAN side address of the NAT router included in the local network to which the "server A" belongs, as the IP address for accessing the "server A". Then, the "terminal A" sets "123.45.67.89" notified from the DNS server as the destination address and starts the transmission of the data. However, since there is no equipment with an IP address of "123.45.67.89" in the local network, the data transmitted from the "terminal A" is transmitted to the NAT router. In this case, since the destination of the data transmitted from the "terminal A" is the WAN side address of the NAT router, the NAT router recognizes that the data transmitted from the "terminal A" is transmitted to the NAT router. As a result, the data transmitted to the "server A" from the "terminal A" is not transmitted to the "server A".

In order to solve such a technical problem, for example, the patent document 1 discloses the configuration that a unique DNS server is disposed in each local network. Moreover, the patent document 2 discloses the configuration that the global network is provided with a relay center for further converting the global address, which is converted from the host name, to the local address.

Moreover, according to a "hairpin support router" defined in Request for Comment (RFC)-4787, the data transmitted to the WAN side address of the hairpin support router can be transmitted again to the local address.

PRIOR ART DOCUMENT

Patent Document

Patent document 1: Japanese Patent Application Laid Open No. 2001-320418
Patent document 2: Japanese Patent Application Laid Open No. 2003-188901

DISCLOSURE OF INVENTION

Subject to be Solved by the Invention

However, according to the configuration disclosed in the patent document 1, it is necessary to provide the unique DNS servers for all the local networks. Thus, the network configuration increases, and the cost which is required for that network configuration also increases.

Moreover, according to the configuration disclosed in the patent document 2, it is necessary to newly install special hardware (equipment) which is the relay center. This increases the cost for installing the relay center.

Moreover, even if the hairpin support router is used, all the routers that exist in the current network are not necessarily the hairpin support router. Thus, the cost which is required for the replacement of those routers will be huge.

In view of the aforementioned problems, it is therefore an object of the present invention to provide, for example, a communication terminal capable of communicating with a different terminal relatively easily and at relatively low cost, an address resolution server capable of making the different terminals perform communication relatively easily and at relatively low cost, and a computer program for making a computer function as the communication terminal or the address resolution server.

Means for Solving the Subject

The above object of the present invention can be achieved by a communication terminal for communicating with another end terminal which belongs to a same network or which belongs to another network directly or indirectly connected via a router, by using a host name which is unique to the another end terminal, the communication terminal provided with: an obtaining device for presenting the host name of the another end terminal to an address resolution server, which transmits control information necessary to communicate with the another end terminal, thereby obtaining from the address resolution server a second address bundle indicating a network route from a global network, to which the address resolution server belongs, to the another end terminal, as the control information; a recognizing device for recognizing a positional relation on the network between the communication terminal and the another end terminal, on the basis of the second address bundle obtained by the obtaining device and a first address bundle indicating a network route from the global network, to which the address resolution server belongs, to the communication terminal; and a determining device for determining a host address, which is used for the communication with the another end terminal, from among the second address bundle obtained by the obtaining device, on the basis of the positional relation on the network between the communication terminal and the another end terminal recognized by the recognizing device.

The above object of the present invention can be also achieved by an address resolution server for transmitting control information necessary for a communication terminal to communicate with an another end terminal which belongs to a same network as a network to which the communication terminal belongs or which belongs to a network mutually connected via a router to the network to which the communication terminal belongs, by using a host name which is unique to the another end terminal, the address resolution server provided with: a storing device for storing an address bundle indicating a network route from a global network, to which the address resolution server belongs, to the another end terminal; and a transmitting device for transmitting the address bundle as the control information to the communication terminal in response to an address resolution request from the communication terminal which presents the host name of the another end terminal.

The above object of the present invention can be also achieved by a first computer program for controlling a computer provided for the communication terminal of the present invention, the computer program making the computer function as the obtaining device, the recognizing device, and the determining device.

The above object of the present invention can be also achieved by a second computer program for controlling a computer provided for the address resolution server of the present invention, the computer program making the computer function as the storing device and the transmitting device.

The operation and other advantages of the present invention will become more apparent from the embodiments explained below.

BRIEF DESCRIPTION OF DRAWINGS

FIG. 4 is a data structure diagram conceptually showing an address administration table.

FIG. 7 are data structure diagrams conceptually showing an address administration table including the address bundle obtained as a result of performing a second examination/registration method.

BEST MODE FOR CARRYING OUT THE INVENTION

Figure 1:
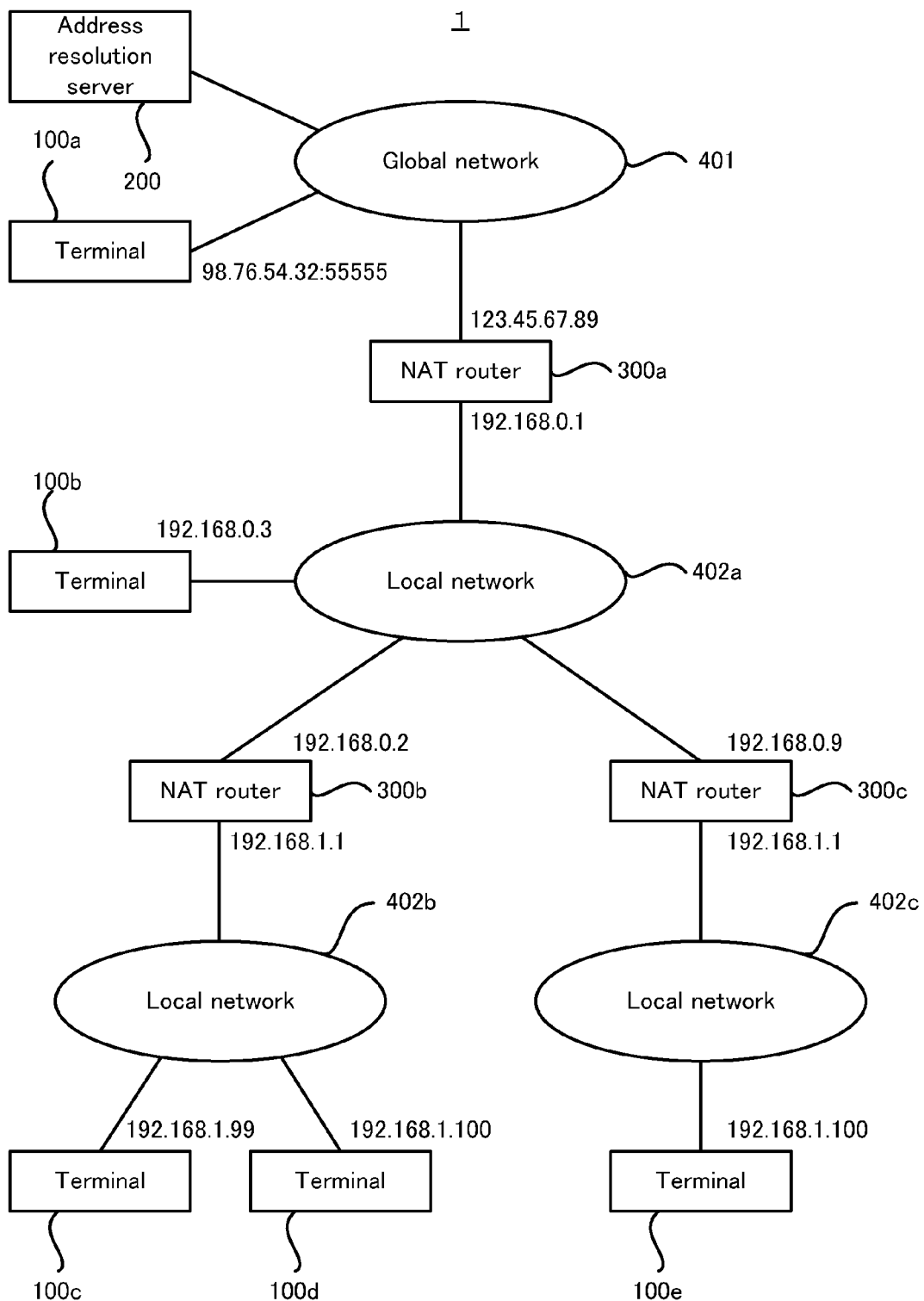
FIG. 1 is a block diagram conceptually showing the entire configuration of a communication system in an example.

Hereinafter, as the mode for carrying out the present invention, an explanation will be given on embodiments of the communication terminal, the address resolution server, and the computer program of the present invention.

<1>
(Embodiment of Communication Terminal)

An embodiment of the communication terminal of the present is a communication terminal for communicating with another end terminal which belongs to a same network or which belongs to another network directly or indirectly connected via a router, by using a host name which is unique to the another end terminal, the communication terminal provided with: an obtaining device for presenting the host name of the another end terminal to an address resolution server, which transmits control information necessary to communicate with the another end terminal, thereby obtaining from the address resolution server a second address bundle indicating a network route from a global network, to which the address resolution server belongs, to the another end terminal, as the control information; a recognizing device for recognizing a positional relation on the network between the communication terminal and the another end terminal, on the basis of the second address bundle obtained by the obtaining device and a first address bundle indicating a network route from the global network, to which the address resolution server belongs, to the communication terminal; and a determining device for determining a host address, which is used for the communication with the another end terminal, from among the second address bundle obtained by the obtaining device, on the basis of the positional relation on the network between the communication terminal and the another end terminal recognized by the recognizing device.

According to the embodiment of the communication terminal of the present invention, by specifying the host name of the another end terminal as the destination of data, it is possible to communicate (e.g. transmit the data) with the another end terminal. Incidentally, the another end terminal may belong to the same network as the network to which the communication terminal belongs. Alternatively, the another end terminal may belong to the network directly connected via the router to the network to which the communication terminal belongs (i.e. the network which has one router between this network itself and the network to which the communication terminal belongs). Alternatively, the another end terminal may belong to the network indirectly connected via the router to the network to which the communication terminal belongs (i.e. the network which has a plurality of routers or another network between this network itself and the network to which the communication terminal belongs).

In particular, the communication terminal in the embodiment is provided with the obtaining device, the recognizing device, and the determining device in order to communicate with the another end terminal.

The obtaining device presents the host name of the another end terminal to the address resolution server, thereby obtaining from the address resolution server the second address bundle corresponding to the host name of the another end terminal. Here, the "address resolution server" in the embodiment indicates a server for converting the host name to the address bundle. By virtue of the address resolution server as described above, the communication terminal (or a user of the communication terminal) no longer needs to recognize the host address of the another end terminal or the like in advance. Moreover, the "address bundle" in the embodiment broadly means information indicating the network route from the global network, to which the address resolution server belongs, to the terminal (i.e. the communication terminal or the another end terminal), and it may be any type of information as long as it can specify the network route. Typically, the "address bundle" is an address bundle including, as a group, the addresses of various equipment and various terminals or the like (e.g. the host address such as an IP address, and an equipment address such as a MAC address) which exist in the network route from the global network, to which the address resolution server belongs, to the terminal (i.e. the communication terminal or the another end terminal).

The recognizing device recognizes the positional relation on the network between the communication terminal and the another end terminal on the basis of each of the second address bundle obtained by the obtaining device and the first address bundle indicating the network route from the global network, to which the address resolution server belongs, to the communication terminal. Specifically, for example, the recognizing device recognizes the positional relation between the network to which the communication terminal belongs and the network to which the another end terminal belongs, or the like.

Incidentally, the first address bundle which is used for the operations of the recognizing device may be obtained from the address resolution server by the operations of the obtaining device described above. Alternatively, it may be obtained by the operations of an examining device described later (i.e. the operations of the communication terminal itself). Alternatively, it may be obtained by some other device.

The determining device determines the host address which is used for the communication with the another end terminal (i.e. the host address which is the destination of the data), on the basis of the positional relation on the network between the communication terminal and the another end terminal recognized by the recognizing device. Specifically, for example, if the recognizing device recognizes that the communication terminal and the another end terminal belong to the same network, it is considered that the host address of the another end terminal is directly (i.e. without changing the host address) used to communicate with the another end terminal. Thus, in this case, the determining device determines the host address of the another end terminal to be the host address which is used for the communication with the another end terminal. Alternatively, if the recognizing device recognizes that the communication terminal and the another end terminal belong to different networks, it is considered that it is hardly possible to communicate with the another end terminal by using only the host address of the another end terminal. Thus, in this case, the determining device determines an upper side host address (e.g. a WAN side host address) of the router located on the network to which the another end terminal belongs to be the host address which is used for the communication with the another end terminal. Alternatively, even if the communication terminal and the another end terminal have another positional relation, to the determining device can determine the host address which allows the communication with the another end terminal to be preferably performed in accordance with the positional relation.

By this, whichever network the another end terminal belongs to (in other words, whichever positional relation the communication terminal and the another end terminal have), the communication terminal can preferably specify the host address which is necessary for the communication with the another end terminal. As a result, the communication terminal can preferably communicate with the another end terminal.

In addition, according to the embodiment, the aforementioned operations can be performed by incorporating software for performing the aforementioned operations to the address resolution server and by incorporating software for performing the aforementioned operations to the terminal (i.e. the communication terminal and the another end terminal). Therefore, it is possible to receive such a practically useful effect that there is no need to introduce new hardware to the existing network. In other words, it is possible to receive such a practically useful effect that the communication terminal (moreover, the address resolution server) for performing the aforementioned operations can be introduced at low cost.

<2>

In one aspect of the embodiment of the communication terminal of the present invention, the first address bundle includes an upper side host address of a router which exists in the network route from the global network, to which the address resolution server belongs, to the communication terminal and a host address of the communication terminal in order of the network route, the second address bundle includes an upper side host address of a router which exists in the network route from the global network, to which the address resolution server belongs, to the another end terminal and a host address of the another end terminal in order of the network route, and the recognizing device recognizes the positional relation on the network between the communication terminal and the another end terminal by comparing a host address included in the first address bundle with a host address included in the second address bundle in order from an upper side to a lower side of the network route.

According to this aspect, the first address bundle includes the address bundle in which the upper side host address of the router which exists in the network route from the global network. to which the address resolution server belongs, to the communication terminal and the host address of the communication terminal are arranged in order from the side closer to the address resolution server or in order from the side farther from the address resolution server. In the same manner, the second address bundle includes the address bundle in which the upper side host address of the router which exists in the network route from the global network, to which the address resolution server belongs, to the another end terminal and the host address of the another end terminal are arranged in order from the side closer to the address resolution server or in order from the side farther from the address resolution server. In other words, each address bundle includes the addresses in a form corresponding to the hierarchy structure of the network. As a result, by comparing the upper side host address of the router included in the first address bundle with the upper side host address of the router included in the second address bundle or by comparing the host address of the communication terminal with the host address of the another end terminal, the recognizing device can preferably recognize the positional relation on the network between the communication terminal and the another end terminal. In particular, the recognizing device can preferably recognize at what hierarchy the communication terminal and the another end terminal belongs to the same network.

<3>

In an aspect of the communication terminal in which the host address included in the first address bundle is compared with the host address included in the second address bundle in order from the upper side to the lower side of the network route, if a host address at a predetermined hierarchy included in the first address bundle is equal to a host address at the predetermined hierarchy included in the second address bundle, the recognizing device may compare a host address at a next hierarchy of the predetermined hierarchy included in the first address bundle with a host address at the next hierarchy of the predetermined hierarchy included in the second address bundle.

By virtue of such a configuration, the recognizing device can preferably recognize at what hierarchy the communication terminal and the another end terminal belongs to the same network. Specifically, for example, if the host addresses at the same hierarchy (e.g. the upper side host addresses of the routers) are the same to each other, the recognizing device can recognize that the communication terminal and the another end terminal belong to the same network at that hierarchy and at more upper side hierarchy. Therefore, in this case, the recognizing device compares the host addresses at a next hierarchy (a lower hierarchy or a hierarchy in a direction of going away from the address resolution server). On the other hand, if the host addresses at the same hierarchy are different from each other, the recognizing device can recognize that the communication terminal and the another end terminal start to belong to different networks from that hierarchy. In other words, the recognizing device can recognize the router located on the upper side of the communication terminal and the router located on the upper side of the another end terminal start to belong to different networks from that hierarchy. Therefore, in this case, if the upper side host address of the router located on the upper side of the another end terminal is determined to be the address which is used for the communication with the another end terminal, it is possible to preferably communicate with the another end terminal.

<4>

In an aspect of the communication terminal in which the host address included in the first address bundle is compared with the host address included in the second address bundle in order from the upper side to the lower side of the network route, if the host address at the predetermined hierarchy included in the first address bundle is different from the host address at the predetermined hierarchy included in the second address bundle, the determining device may determine the host address at the predetermined hierarchy included in the second address bundle to be the host address which is used for the communication with the another end terminal.

By virtue of such a configuration, if the host addresses at the same hierarchy are different from each other, the recognizing device can recognize that the communication terminal and the another end terminal start to belong to different networks from that hierarchy. In other words, the recognizing device can recognize that the router located on the upper side of the communication terminal and the router located on the upper side of the another end terminal start to belong to different networks from that hierarchy. Therefore, if the upper side host address of the router located on the upper side of the another end terminal is determined to be the address which is used for the communication with the another end terminal, it is possible to preferably communicate with the another end terminal.

<5>

In another aspect of the embodiment of the communication terminal of the present invention, it is further provided with: an examining device for examining the network route from the global network, to which the address resolution server belongs, to the communication terminal; and a registering device for registering the first address bundle in the address resolution server, on the basis of a result of the examination by the examining device.

According to this aspect, the address bundle examined by the communication terminal can be registered in the address resolution server. Thus, it is possible to preferably perform the aforementioned operations using the address bundle.

<6>

In an aspect of the communication terminal provided with the examining device and the registering device as described above, if a router which exists in the network route from the global network, to which the address resolution server belongs, to the communication terminal is a Universal Plug and Play (UPnP) support router, the examining device may use a UPnP command with respect to a lower side host address of a first router, which is the router located closest to the communication terminal, and may obtain an upper side host address of the first router, thereby examining the network route from the global network, to which the address resolution server belongs, to the communication terminal, and the registering device may register, in the address resolution server, an address bundle including the upper side host address of the first router and a host address of the communication terminal on a network to which the first route belongs, which are obtained by the examining device, in order to the network route, as the first address bundle.

By virtue of such a configuration, as detailed later with reference to a specific example, the communication terminal can preferably examine the address bundle. As a result, it is possible to register the address bundle examined by the communication terminal, in the address resolution server. Thus, it is possible to preferably perform the aforementioned operations using the address bundle.

<7>

In an aspect of the communication terminal in which the examining device obtains the upper side host address of the first router by using the UPnP command, as described above, if there is a second router which is the router that belongs to a network on an upper side of the first router, the examining device firstly may (i) change an operating mode of the first router to a bridge mode and obtain, from the second router, a host address of the communication terminal on a network to which the second router belongs, by using a Dynamic Host Configuration Protocol (DHCP) server, (ii) use the UPnP command with respect to a lower side host address of the second router and obtain an upper side host address of the second router, (iii) change the first router into a router mode and return the host address of the communication terminal on the network to which the first router belongs, into a previous state of a state of (i), and (iv) use the UPnP command with respect to the lower side host address of the first router and obtain the upper side host address of the first router, thereby examining the network route from the global network, to which the address resolution server belongs, to the communication terminal, and the registering device may register, in the address resolution server, an address bundle further including the upper side host address of the second router obtained by the examining device, as the first address bundle.

By virtue of such a configuration, as detailed later with reference to a specific example, even if there are a plurality of routers in the network route from the global network, to which the address resolution serer belongs, to the communication terminal, the communication terminal can preferably examine the address bundle. As a result, it is possible to register the address bundle examined by the communication terminal, in the address resolution server. Thus, it is possible to preferably perform the aforementioned operations using the address bundle.

<8>

In an aspect of the communication terminal provided with the examining device and the registering device as described above, the examining device may request an upper side host address of the router which exists in the network from the global network, to which the address resolution server belongs, to the communication terminal with respect to an address examination server which belongs to the global network, to which the address resolution server belongs, and which examines a network route reaching to the communication terminal, thereby examining the network route from the global network, to which the address resolution server belongs, to the communication terminal, and the registering device may register an address bundle including the upper side host address obtained from the address examination server and a host address of the communication terminal in order of the network route, as the first address bundle.

By virtue of such a configuration, as detailed later with reference to a specific example, it is possible to register the address bundle including the upper side host address of the router obtained by the operations of the exterior address examination server, or the like, in the address resolution server. Thus, it is possible to preferably perform the aforementioned operations using the address bundle.

<9>

In an aspect of the communication terminal provided with the examining device and the registering device as described above, the registering device registers an address bundle including a lower side host address of the router and a host address of said communication terminal in order of the network route, as the first address bundle.

By virtue of such a configuration, even if the address bundle including the lower side host address of the router (e.g. a LAN side host address) is registered in addition to or instead of the upper side host address of the router, it is possible to appropriately perform the aforementioned operations.

<10>

In an aspect of the communication terminal provided with the examining device and the registering device as described above, the registering device may register an address bundle including a lower side host address of the router, a host address of said communication terminal, and an equipment address which is unique to the communication terminal in order of the network route, as the first address bundle.

By virtue of such a configuration, even if the address bundle including the equipment address which is unique to the communication terminal (e.g. a MAC address) is registered, it is possible to appropriately perform the aforementioned operations.

<11>

In an aspect of the communication terminal provided with the examining device and the registering device as described above, the examining device may request another communication terminal located on an upper side of the router to obtain an upper side host address of the router, and the registering address may register an address bundle including the upper side host address obtained from the another communication terminal and a host address of said communication terminal in order to the network route, as the first address bundle.

By virtue of such a configuration, as detailed later with reference to a specific example, it is possible to register the address bundle including the upper side host address of the router obtained by the operations of another exterior communication terminal, or the like, in the address resolution server. Thus, it is possible to preferably perform the aforementioned operations using the address bundle.

<12>

In another aspect of the embodiment of the communication terminal of the present invention, the obtaining device obtains the first address bundle as the control information from the address resolution server.

According to this aspect, since the first address bundle can be obtained from the address resolution server, it is possible to obtain the first address bundle, relatively easily.

<13>

In another aspect of the embodiment of the communication terminal of the present invention, it is further provided with a notifying device for obtaining an upper side address of the router located between the communication terminal and another communication terminal, in response to a request from the another communication terminal, wherein the another communication terminal belongs to a network on a lower side of the network to which the communication terminal belongs, and for notifying the obtained upper side address to the another communication terminal.

According to this aspect, as detailed later with reference to a specific example, it is possible to register, in the address resolution server, the address bundle including the upper side host address of the router obtained by the communication terminal itself, or the like, as the address bundle corresponding to another communication terminal. Thus, it is possible to preferably perform the aforementioned operations using the address bundle.

<14>

(Embodiment of Address Resolution Server)

An embodiment of the address resolution server of the present invention is an address resolution server for transmitting control information necessary for a communication terminal to communicate with an another end terminal which belongs to a same network as a network to which the communication terminal belongs or which belongs to a network mutually connected via a router to the network to which the communication terminal belongs, by using a host name which is unique to the another end terminal, the address resolution server provided with: a storing device for storing an address bundle indicating a network route from a global network, to which the address resolution server belongs, to the another end terminal; and a transmitting device for transmitting the address bundle as the control information to the communication terminal in response to an address resolution request from the communication terminal which presents the host name of the another end terminal.

According to the embodiment of the address resolution server of the present invention, it is possible to transmit the address bundle stored in the storing device (i.e. the address bundle corresponding to the another end terminal) to the communication terminal which is to communicate with the another end terminal. Therefore, as described above, the communication terminal can determine the host address which is used for the communication with the another end terminal. As a result, it is possible to preferably receive the aforementioned various effects.

Incidentally, in response to the various aspects of the embodiment of the communication terminal of the present invention described above, the embodiment of the address resolution server of the present invention can also adopt various aspects.

<15>

In another aspect of the embodiment of the address resolution server of the present invention, the address bundle includes an upper side host address or a lower side host address of the router which exists in the network route from the global network, to which the address resolution server belongs, to the another end terminal, and a host address of the another end terminal, in order of the network route.

According to this aspect, the communication terminal can preferably recognize the positional relation on the network between the communication terminal and the another end terminal by comparing the upper side host address of the router included in the first address bundle (e.g. a WAN side host address) with the upper side host address of the router included in the second address bundle (e.g. a WAN side host address) or by comparing the host address of the communication terminal with the host address of the another end terminal.

<16>

(Embodiments of Computer Program)

A first embodiment of the computer program of the present invention is a computer program for controlling a computer provided for the embodiment of the communication terminal of the present invention described above (including its various aspects), the computer program making the computer function as the obtaining device, the recognizing device, and the determining device.

According to the first embodiment of the computer program of the present invention, the embodiment of the communication terminal of the present invention described above can be relatively easily realized as the computer reads and executes the computer program from a recording medium for storing the computer program, such as a ROM, a CD-ROM, a DVD-ROM, and a hard disk, or as it executes the computer program after downloading the program through a communication device.

Incidentally, in response to the various aspects in the embodiment of the communication terminal of the present invention described above, the first embodiment of the computer program of the present invention can also adopt various aspects.

<17>

A second embodiment of the computer program of the present invention is a computer program for controlling a computer provided for the embodiment of the address resolution server of the present invention described above (including its various aspects), the computer program making the computer function as the storing device and the transmitting device.

According to the second embodiment of the computer program of the present invention, the embodiment of the address resolution server of the present invention described above can be relatively easily realized as the computer reads and executes the computer program from a recording medium for storing the computer program, such as a ROM, a CD-ROM, a DVD-ROM, and a hard disk, or as it executes the computer program after downloading the program through a communication device.

Incidentally, in response to the various aspects in the embodiment of the address resolution server of the present invention described above, the second embodiment of the computer program of the present invention can also adopt various aspects.

(Embodiments of Computer Program Product)

A first embodiment of the computer program product of the present invention is a computer program product in a computer-readable medium for tangibly embodying a program of instructions executable by a computer provided for the embodiment of the communication terminal of the present invention described above (including its various aspects), the computer program product making the computer function as the obtaining device, the recognizing device, and the determining device.

According to the first embodiment of the computer program product of the present invention, the embodiment of the communication terminal of the present invention described above can be embodied relatively readily, by loading the computer program product from a recording medium for storing the computer program product, such as a ROM, a CD-ROM, a DVD-ROM, a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the embodiment of the communication terminal of the present invention described above.

Incidentally, in response to the various aspects in the embodiment of the communication terminal of the present invention described above, the first embodiment of the computer program product of the present invention can also adopt various aspects.

A second embodiment of the computer program product of the present invention is a computer program product in a computer-readable medium for tangibly embodying a program of instructions executable by a computer provided for the embodiment of the address resolution server of the present invention described above (including its various aspects), the computer program product making the computer function as the storing device and the transmitting device.

According to the second embodiment of the computer program product of the present invention, the embodiment of the address resolution server of the present invention described above can be embodied relatively readily, by loading the computer program product from a recording medium for storing the computer program product, such as a ROM, a CD-ROM, a DVD-ROM, a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the embodiment of the address resolution server of the present invention described above.

Incidentally, in response to the various aspects in the embodiment of the address resolution server of the present invention described above, the second embodiment of the computer program product of the present invention can also adopt various aspects.

The operation and other advantages of the present invention will become more apparent from the example explained below.

As explained above, according to the embodiment of the communication terminal of the present invention, it is provided with the obtaining device, the recognizing device, and the determining device. According to the embodiment of the address resolution server of the present invention, it is provided with the storing device and the transmitting device. According to the first embodiment of the computer program of the present invention, it makes a computer function as the embodiment of the communication terminal of the present invention. According to the second embodiment of the computer program of the present invention, it makes a computer function as the embodiment of the address resolution server of the present invention. Therefore, it is possible to communicate with a different terminal, relatively easily and at relatively low cost.

Example

Hereinafter, an example of the present invention will be explained on the basis of the drawings.
(1) Basic Configuration
Firstly, with reference to FIG. 1 to FIG. 4, the basic configuration of a communication system 1 in an example will be explained.
(1-1) Entire Configuration
Firstly, with reference to FIG. 1, the entire configuration of the communication system 1 in the example will be explained. FIG. 1 is a block diagram conceptually showing the entire configuration of the communication system 1 in the example.

As shown in FIG. 1, the communication system 1 in the example is provided with: a plurality of communication terminals 100 for transmitting/receiving data (specifically, a communication terminal 100a, a communication terminal 100b, a communication terminal 100c, a communication terminal 100d, and a communication terminal 100e); an address resolution serve 200 for converting a host name to an address bundle 221 in response to an address resolution request from the communication terminal 100 and for transmitting the address bundle 221 to the communication terminal 100; and a plurality of NAT routers 300 for connecting different networks (specifically, an NAT router 300a, an NAT router 300b, and an NAT router 300c).

Moreover, these equipment or devices constitute a global network 401 or a local network 402 (specifically, a local network 402a, a local network 402b, and a local network 402c). Incidentally, the global network 401 and the local network 402 may have a wired form or a wireless form. Alternatively, one portion of the networks may be wired, and another portion may be wireless. Moreover, each of the networks may be a dedicated line, a public line, a phone line, a packet network, a line switching network, or the like. In other words, the global network 401 and the local network 402 may be any type of network as long as it can transmit and receive the data.

To the global network 401, the communication terminal 100a whose global IP address is "98.76.54.32" and whose host name is "A" and the address resolution server 200 are connected. Moreover, to the global network 401, the NAT router 300a whose global IP address on the WAN side is "123.45.67.89" is connected via a network port on the WAN side.

To the local network 402a, the communication terminal 100b whose local IP address is "192.168.0.3" and whose host name is "B" is connected. Moreover, to the local network 402a, the NAT router 300a whose local IP address on the LAN side is "192.168.0.1" is connected via a network port on the LAN side. Moreover, to the local network 402a, the NAT router 300b whose local IP address on the WAN side is "192.168.0.2" is connected via a network port on the WAN side. Moreover, to the local network 402a, the NAT router 300c whose local IP address on the WAN side is "192.168.0.9" is connected via a network port on the WAN side.

To the local network 402b, the communication terminal 100c whose local IP address is "192.168.1.99" and whose host name is "C" and the communication terminal 100d whose local IP address is "192.168.1.100" and whose host name is "D" are connected. Moreover, to the local network 402b, the NAT router 300b whose local IP address on the LAN side is "192.168.1.1" is connected via a network port on the LAN side.

To the local network 402c, the communication terminal 100e whose local IP address is "192.168.1.100" and whose host name is "E" is connected. Moreover, the local network 402c, the NAT router 300c whose local IP address on the LAN side is "192.168.1.1" is connected via a network port on the LAN side.

Incidentally, as one example of the communication system 1, a communication system installed in a housing complex such as an apartment building is listed. In this case, for example, the global network 401 corresponds to the Internet, the local network 402a corresponds to the local network of the entire apartment building, and each of the local networks 402b and 402c corresponds to the local network of each room in the apartment building.

Figure 2:
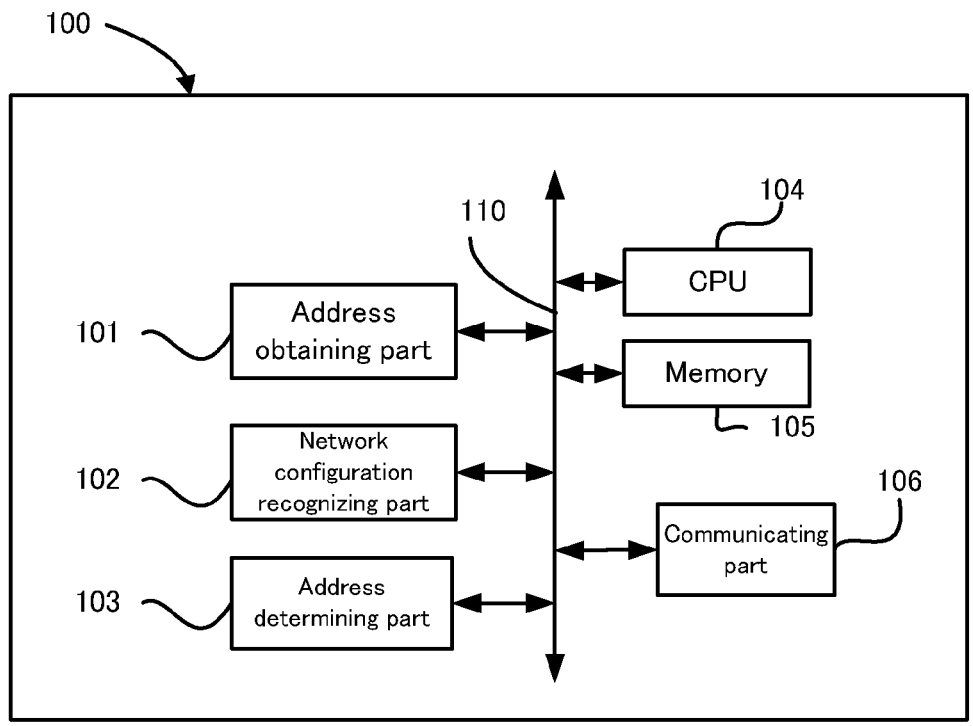
FIG. 2 is a block diagram conceptually showing the basic structure of a communication terminal provided for the communication system in the example.

(1-2) Basic Structure of Communication Terminal
Next, with reference to FIG. 2, the basic of the communication terminal 100 provided for the communication system 1 in the example will be explained. FIG. 2 is a block diagram conceptually structure showing the basic structure of the communication terminal 1 in the example.

As shown in FIG. 2, the communication terminal 100 is provided with: an address obtaining part 101 which constitutes one specific example of the "obtaining device" of the present invention; a network configuration recognizing part 102 which constitutes one specific example of the "recognizing device" of the present invention; an address determining part 103 which constitutes one specific example of the "determining device" of the present invention; a CPU 104; a memory 105; and a communicating part 106.

The address obtaining part 101 presents, to the address resolution server 200, the host name of the communication terminal 100 which is the other end of the communication, thereby obtaining, from the address resolution server 200, the address bundle 221 corresponding to the communication terminal 100 which is the other end of the communication. Incidentally, the address bundle 221 will be detailed later (refer to FIG. 4).

The network configuration recognizing part 102 examines and recognizes a positional relation on the network between the communication terminal 100 and the communication terminal 100 which is the other end of the communication (in other words, a positional relation in the communication system), on the basis of the address bundle 221 obtained by the address obtaining part 101. Incidentally, the details of the operations of the network configuration recognizing part 102 will be detailed later (refer to FIG. 5, FIG. 9, etc.).

The address determining part 103 determines the IP address which is used to communicate with the communication terminal 100 which is the other end of the communication (i.e. the IP address of the destination of the data), on the basis of the recognition result of the network configuration recognizing part 102. Incidentally, the details of the operations of the address determining part 103 will be detailed later (refer to FIG. 5, FIG. 9, etc.).

The CPU 104 is connected via a bus 110 to the address obtaining part 101, the network configuration recognizing part 102, the address determining part 103, and the communicating part 106. The CPU 104 gives an instruction to various control devices, thereby controlling the entire communication terminal 100. Normally, software or firmware for operating the CPU 104 is stored in the memory 105.

The memory 105 is used in the general data processing of the communication terminal 100. Specifically, the memory 105 is provided with a ROM area in which a program for operating as the communication terminal 100 (i.e. a firmware program), a RAM area in which data is temporarily stored or a parameter necessary for the operations of the firmware program or the like is stored, or the like.

The communicating part 106 controls the communication via the global network 401 and the local network 402 performed by the communication terminal 100 (e.g. communication by HTTP or the like).

(1-3) Basic Structure of Address Resolution Server

Figure 3:
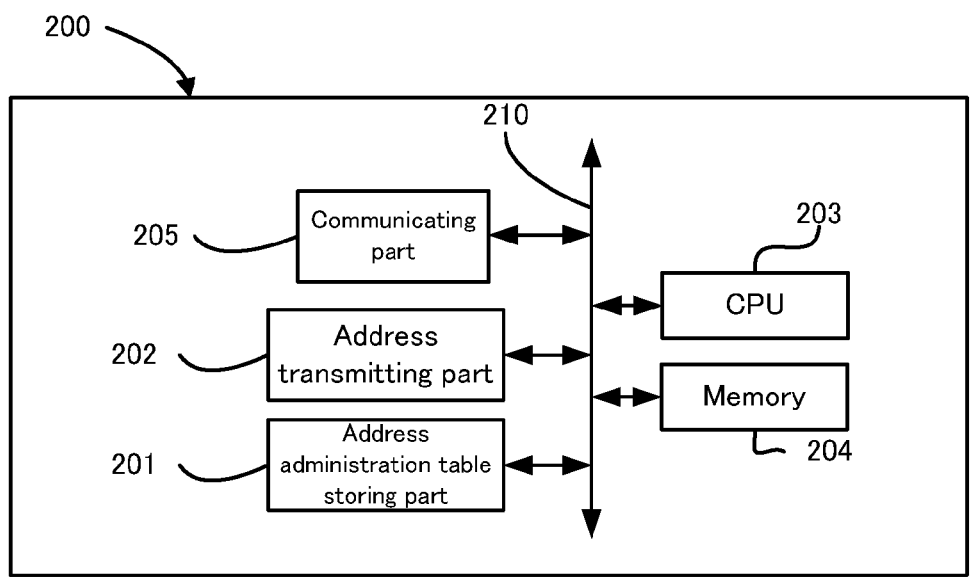
FIG. 3 is a block diagram conceptually showing the basic structure of an address resolution server provided for the communication system in the example.

Next, with reference to FIG. 3, the basic structure of the address resolution server 200 provided for the communication system 1 in the example will be explained. FIG. 3 is a block diagram conceptually showing the basic structure of the address resolution server 200 provided for the communication system 1 in the example.

As shown in FIG. 3, the address resolution server 200 is provided with: an address administration table storing part 201 which constitutes one specific example of the "storing device" of the present invention; an address transmitting part 202 which constitutes one specific example of the "transmitting device" of the present invention; a CPU 203; a memory 204; and a communicating part 205.

The address administration table storing part 201 stores an address administration table 220 including the address bundle 221 corresponding to each of the plurality of communication terminals 100 included in the communication system 1. The address administration table storing part 201 typically includes a recoding medium such as a hard disk and a semiconductor memory.

Now, with reference to FIG. 4, the address administration table 220 will be explained. FIG. 4 is a data structure diagram conceptually showing the address administration table 220.

As shown in FIG. 4, the address administration table 220 includes the address bundle 221 corresponding to each of the plurality of communication terminals 100 included in the communication system 1. More specifically, the address administration table 220 includes the address bundle 221 corresponding to the communication terminal 100a, the address bundle 221 corresponding to the communication terminal 100b, the address bundle 221 corresponding to the communication terminal 100c, the address bundle 221 corresponding to the communication terminal 100d, and the address bundle 221 corresponding to the communication terminal 100e.

The address bundle 221 includes information capable of specifying a network route from the global network 401, to which the address resolution server 200 belongs, to the communication terminal 100. Specifically, for example, the address bundle 221 includes the IP address of the communication terminal 100 and the WAN side IP address of the NAT router 300 which exist in the network route from the global network 401, to which the address resolution server 200 belongs, to the communication terminal 100.

More specifically, in a network route from the global network 401, to which the address resolution server 200 belongs, to the communication terminal 100a, the address resolution server 200 and the communication terminal 100a exist. Thus, the address bundle 221 corresponding to the communication terminal 100a includes "98.76.54.32" which is the global IP address of the communication terminal 100a. Moreover, the address bundle 221 corresponding to the communication terminal 100a includes "55555" which is a port number used by the communication terminal 100a for the communication, in addition to the global IP address of the communication terminal 100a. Therefore, the address bundle 221 corresponding to the communication terminal 100a includes a data arrangement of "98.76.54.32:55555".

In the same manner, in a network route from the global network 401, to which the address resolution server 200 belongs, to the communication terminal 100b, the address resolution server 200, the NAT router 300a, and the communication terminal 100b exist. Thus, the address bundle 221 corresponding to the communication terminal 100b includes "123.45.67.89" which is the global IP address on the WAN side of the NAT router 300a and "192.168.0.3" which is the local IP address of the communication terminal 100b. Moreover, these addresses are included in the address bundle 221 such that these addresses are arranged in order from the upper side to the lower side of the network route from the global network 401, to which the address resolution server 200 belongs, to the communication terminal 100b. In other words, the address bundle 221 corresponding to the communication terminal 100b includes "123.45.67.89" which is the global IP address on the WAN side of the NAT router 300a and "192.168.0.3" which is the local IP address of the communication terminal 100b such that they are arranged in this order. Moreover, in the example shown in FIG. 4, the address bundle 221 corresponding to the communication terminal 100b includes "40000" which is a port number used when the NAT router 300a forwards the communication for the communication terminal 100b, in addition to the global IP address on the WAN side of the NAT router 300a, such that the port number "40000" is associated with the global IP address on the WAN side of the NAT router 300a. In the same manner, the address bundle 221 corresponding to the communication terminal 100b includes "54321" which is a port number used by the communication terminal 100b for the communication, in addition to the local IP address of the communication terminal 100b, such that the port number "54321" is associated with the local IP address of the communication terminal 100b. Therefore, the address bundle 221 corresponding to the communication terminal 100b includes a data arrangement of "123.45.67.89:40000-192.168.0.3:54321".

In the same manner, in a network route from the global network 401, to which the address resolution server 200 belongs, to the communication terminal 100c, the address resolution server 200, the NAT router 300a, the NAT router 300b, and the communication terminal 100c exist. Thus, the address bundle 221 corresponding to the communication terminal 100c includes "123.45.67.89" which is the global IP address on the WAN side of the NAT router 300a, "192.168.0.2" which is the local IP address on the WAN side of the NAT router 300b, and "192.168.1.99" which is the local IP address of the communication terminal 100c. Moreover, these addresses are included in the address bundle 221 such that these addresses are arranged in order from the upper side to the lower side of the network route from the global network 401, to which the address resolution server 200 belongs, to the communication terminal 100c. In other words, the address bundle 221 corresponding to the communication terminal 100c includes "123.45.67.89" which is the global IP address on the WAN side of the NAT router 300a, "192.168.0.2" which is the local IP address on the WAN side of the NAT router 300b, and "192.168.1.99" which is the local IP address of the communication terminal 100c such that they are arranged in this order. Moreover, in the example shown in FIG. 4, the address bundle 221 corresponding to the communication terminal 100c includes "40001" which is a port number used when the NAT router 300a forwards the communication for the communication terminal 100c, in addition to the global IP address on the WAN side of the NAT router 300a, such that the port number "40001" is associated with the global IP address on the WAN side of the NAT router 300a. In the same manner, the address bundle 221 corresponding to the communication terminal 100c includes "44444" which is a port number used when the NAT router 300b forwards the communication for the communication terminal 100c, in addition to the local IP address on the WAN side of the NAT router 300b, such that the port number "44444" is associated with the local IP address on the WAN side of the NAT router 300b. In the same manner, the address bundle 221 corresponding to the communication terminal 100c includes "54321" which is a port number used by the communication terminal 100c for the communication, in addition to the local IP address of the communication terminal 100c, such that the port number "54321" is associated with the local IP address of the communication terminal 100c. Therefore, the address bundle 221 corresponding to the communication terminal 100c includes a data arrangement of "123.45.67.89:40001-192.168.0.2:44444-192.168.1.99:54321".

In the same manner, in a network route from the global network 401, to which the address resolution server 200 belongs, to the communication terminal 100d, the address resolution server 200, the NAT router 300a, the NAT router 300b, and the communication terminal 100d exist. Thus, the address bundle 221 corresponding to the communication terminal 100d includes "123.45.67.89" which is the global IP address on the WAN side of the NAT router 300a, "192.168.0.2" which is the local IP address on the WAN side of the NAT router 300b, and "192.168.1.100" which is the local IP address of the communication terminal 100d. Moreover, these addresses are included in the address bundle 221 such that these addresses are arranged in order from the upper side to the lower side of the network route from the global network 401, to which the address resolution server 200 belongs, to the communication terminal 100d. In other words, the address bundle 221 corresponding to the communication terminal 100d includes "123.45.67.89" which is the global IP address on the WAN side of the NAT router 300a, "192.168.0.2" which is the local IP address on the WAN side of the NAT router 300b, and "192.168.1.100" which is the local IP address of the communication terminal 100d such that they are arranged in this order. Moreover, in the example shown in FIG. 4, the address bundle 221 corresponding to the communication terminal 100d includes "40002" which is a port number used when the NAT router 300a forwards the communication for the communication terminal 100d, in addition to the global IP address on the WAN side of the NAT router 300a, such that the port number "40002" is associated with the global IP address on the WAN side of the NAT router 300a. In the same manner, the address bundle 221 corresponding to the communication terminal 100d includes "44445" which is a port number used when the NAT router 300b forwards the communication for the communication terminal 100d, in addition to the local IP address on the WAN side of the NAT router 300b, such that the port number "44445" is associated with the local IP address on the WAN side of the NAT router 300b. In the same manner, the address bundle 221 corresponding to the communication terminal 100d includes "54321" which is a port number used by the communication terminal 100d for the communication, in addition to the local IP address of the communication terminal 100d, such that the port number "54321" is associated with the local IP address of the communication terminal 100d. Therefore, the address bundle 221 corresponding to the communication terminal 100d includes a data arrangement of "123.45.67.89:40002-192.168.0.2:44454-192.168.1.10054321".

In the same manner, in a network route from the global network 401, to which the address resolution server 200 belongs, to the communication terminal 100e, the address resolution server 200, the NAT router 300a, the NAT router 300c, and the communication terminal 100e exist. Thus, the address bundle 221 corresponding to the communication terminal 100e includes "123.45.67.89" which is the global IP address on the WAN side of the NAT router 300a, "192.168.0.9" which is the local IP address on the WAN side of the NAT router 300c, and "192.168.1.100" which is the local IP address of the communication terminal 100e. Moreover, these addresses are included in the address bundle 221 such that these addresses are arranged in order from the upper side to the lower side of the network route from the global network 401, to which the address resolution server 200 belongs, to the communication terminal 100e. In other words, the address bundle 221 corresponding to the communication terminal 100e includes "123.45.67.89" which is the global IP address on the WAN side of the NAT router 300a, "192.168.0.9" which is the local IP address on the WAN side of the NAT router 300c, and "192.168.1.100" which is the local IP address of the communication terminal 100e such that they are arranged in this order. Moreover, in the example shown in FIG. 4, the address bundle 221 corresponding to the communication terminal 100e includes "40003" which is a port number used when the NAT router 300a forwards the communication for the communication terminal 100e, in addition to the global IP address on the WAN side of the NAT router 300a, such that the port number "40003" is associated with the global IP address on the WAN side of the NAT router 300a. In the same manner, the address bundle 221 corresponding to the communication terminal 100e includes "33333" which is a port number used when the NAT router 300c forwards the communication for the communication terminal 100e, in addition to the local IP address on the WAN side of the NAT router 300c, such that the port number "33333" is associated with the local IP address on the WAN side of the NAT router 300c. In the same manner, the address bundle 221 corresponding to the communication terminal 100e includes "54321" which is a port number used by the communication terminal 100e for the communication, in addition to the local IP address of the communication terminal 100e, such that the port number "54321" is associated with the local IP address of the communication terminal 100e. Therefore, the address bundle 221 corresponding to the communication terminal 100e includes a data arrangement of "123.45.67.89:40003-192.168.0.9:33333-192.168.1.100:54321".

Incidentally, in the example shown in FIG. 4, as the address bundle, the IP address of the communication terminal 100 and the WAN side IP address of the NAT router 300 which exist in the network route from the global network 401, to which the address resolution server 200 belongs, to the communication terminal 100 (moreover, the port number used by the communication terminal 100 or the NAT router 300 for the communication) are included. However, as detailed later, in addition to or instead of the IP address and the port number described above, another information (e.g. the LAN side IP address of the NAT router 300, the MAC addresses of the communication terminal 100 and the NAT router 300 described later) may be included.

Back in FIG. 3, the address transmitting part 202 extracts a desired address bundle 221 from the address administration table 220 stored in the address administration table storing part 201 in response to a request from the communication terminal 100, and transmits the extracted address bundle 221 to the communication terminal 100.

The CPU 203 is connected via a bus 210 to the address administration table storing part 201, the address transmitting part 202, and the communicating part 205. The CPU 203 gives an instruction to various control devices, thereby controlling the entire communication terminal 100. Normally, software or firmware for operating the CPU 203 is stored in the memory 204.

The memory 204 is used in the general data processing of the address resolution server 200. Specifically, the memory 204 is provided with a ROM area in which a program for operating as the address resolution server 200 (i.e. a firmware program), a RAM area in which data is temporarily stored or a parameter necessary for the operations of the firmware program or the like is stored, or the like.

The communicating part 205 controls the communication via the global network 401 and the local network 402 performed by the address resolution server 200 (e.g. communication by HTTP or the like).

(2) Operation Example

Figure 5:
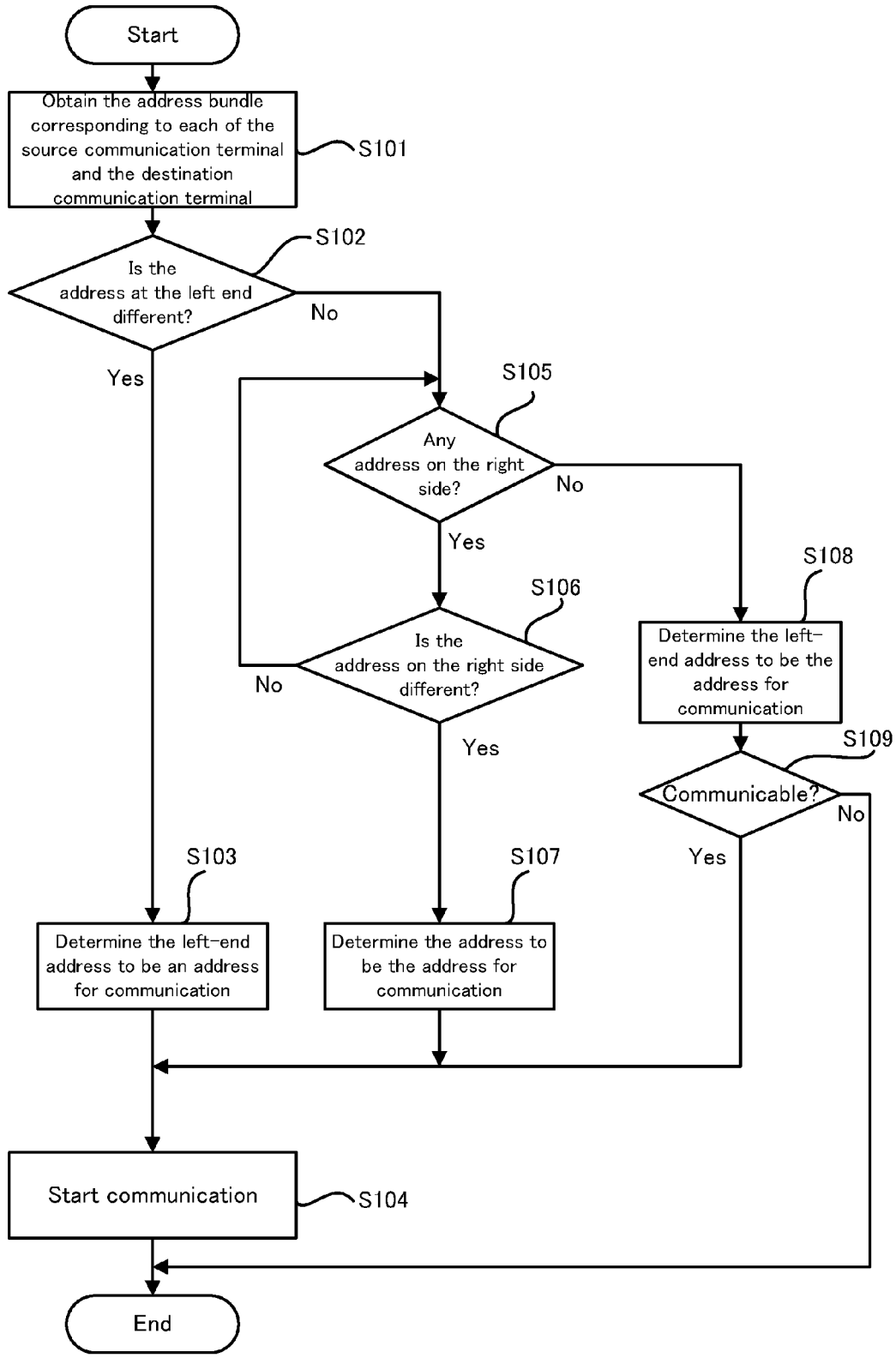
FIG. 5 is a flowchart conceptually showing a flow of operations of the communication system in the example.

Next, with reference to FIG. 5, a flow of the operations of the communication system 1 in the example will be explained. FIG. 5 is a flowchart conceptually showing the flow of the operations of the communication system 1 in the example.

As shown in FIG. 5, firstly, by the operation of the address obtaining part 101 provided for the communication terminal 100 which is the transmitting source of the data (hereinafter referred to as a "source communication terminal 100" for descriptive purpose), each of the address bundle 221 corresponding to the source communication terminal 100 and the address bundle 221 corresponding to the communication terminal 100 which is the transmitting destination of the data (hereinafter referred to as a "destination communication terminal 100" for descriptive purpose) is obtained from the address resolution server 200 (step S101). At this time, the source communication terminal 100 presents the host name of the destination communication terminal 100 and requests the address resolution server 200 to transmit the address bundle 221 corresponding to the destination communication terminal 100. As a result, the address transmitting part 202 provided for the address resolution server 200 reads from the address administration table storing part 201 each of the address bundle 221 corresponding to the source communication terminal 100 and the address bundle 221 corresponding to the destination communication terminal 100 in response to the request from the source communication terminal 100, and transmits the read address bundles 221 to the source communication terminal 100.

Incidentally, as detailed later with reference to FIG. 6, FIG. 8 and the like, the address bundle 221 corresponding to the source communication terminal 100 can be examined by the source communication terminal 100 by using the address examining part 107 (refer to FIG. 6) and an address examination server 500 (refer to FIG. 8). Thus, if the source communication terminal 100 examines the address bundle 221 corresponding to the source communication terminal 100, in the step S101 shown in FIG. 5, the address bundle 221 corresponding to the source communication terminal 100 is not necessarily obtained from the address resolution server 200. In other words, in the step S101 shown in FIG. 5, instead of obtaining the address bundle 221 corresponding to the source communication terminal 100 from the address resolution server 200, the source communication terminal 100 may examine the address bundle 221 corresponding to the source communication terminal 100 to obtain the address 221 corresponding to the source communication terminal 100.

Then, by the operation of the network configuration recognizing part 102 provided for the source communication terminal 100, it is judged whether or not the IP address at the left end of the address bundle 221 corresponding to the source communication terminal 100 obtained in the step S101 (i.e. the IP address on the side closest to the address resolution server 200 (or closest to the global network 401 to which the address resolution server 200 belongs)) is different from the IP address at the left end of the address bundle 221 corresponding to the destination communication terminal 100 obtained in the step S101 (step S102).

As a result of the judgment in the step S102, if it is judged that the IP address at the left end of the address bundle 221 corresponding to the source communication terminal 100 is different from the IP address at the left end of the address bundle 221 corresponding to the destination communication terminal 100 (the step S102: Yes), by the operation of the address determining part 103 provided for the source communication terminal 100, the IP address at the left end of the address bundle 221 corresponding to the destination communication terminal 100 is determined to be the IP address which is used for the source communication terminal 100 to communicate with the destination communication terminal 100 (step S103). Then, after the IP address determined in the step S103 is set as a destination address, the data is transmitted from the source communication terminal 100 to the destination communication terminal 100 (step S104).

On the other hand, as a result of the judgment in the step S102, if it is judged that the IP address at the left end of the address bundle 221 corresponding to the source communication terminal 100 is equal to the IP address at the left end of the address bundle 221 corresponding to the destination communication terminal 100 (the step S102: No), then, by the operation of the network configuration recognizing part 102 provided for the source communication terminal 100, it is judged whether or not there is a next stage IP address in each of the address bundle 221 corresponding to the source communication terminal 100 and the address bundle 221 corresponding to the destination communication terminal 100 (step S105). In other words, it is judged whether or not there is an IP address following the left-end IP address (hereinafter referred to as a "second-stage IP address" as occasion demands) in each of the address bundle 221 corresponding to the source communication terminal 100 and the address bundle 221 corresponding to the destination communication terminal 100.

As a result of the judgment in the step S105, if it is judged that there is the next stage IP address (i.e. the second-stage IP address) in each of the address bundle 221 corresponding to the source communication terminal 100 and the address bundle 221 corresponding to the destination communication terminal 100 (the step S105: Yes), by the operation of the network configuration recognizing part 102 provided for the source communication terminal 100, it is judged whether or not the second-stage IP address of the address bundle 221 corresponding to the source communication terminal 100 is different from the second-stage IP address of the address bundle 221 corresponding to the destination communication terminal 100 (step S106).

As a result of the judgment in the step S106, if it is judged that the second-stage IP address of the address bundle 221 corresponding to the source communication terminal 100 is different from the second-stage IP address of the address bundle 221 corresponding to the destination communication terminal 100 (the step S106: Yes), by the operation of the address determining part 103 provided for the source communication terminal 100, the second-stage IP address of the address bundle 221 corresponding to the destination communication terminal 100 is determined to be the IP address which is used for the source communication terminal 100 to communicate with the destination communication terminal 100 (step S107). Then, after the IP address determined in the step S107 is set as the destination address, the data is transmitted from the source communication terminal 100 to the destination communication terminal 100 (the step S104).

On the other hand, as a result of the judgment in the step S106, if it is judged that the second-stage IP address of the address bundle 221 corresponding to the source communication terminal 100 is equal to the second-stage IP address of the address bundle 221 corresponding to the destination communication terminal 100 (the step S106: No), the process is returned to the step S105, and the operations in the step S105 and the step S106 are repeated until the IP address that is the target of the judging operation in the step S106 no longer exists in each of the address bundle 221 corresponding to the source communication terminal 100 and the address bundle 221 corresponding to the destination communication terminal 100. As a result, if a further next stage IP address (i.e. a third-stage IP address, a fourth-stage IP address, etc.) of the address bundle 221 corresponding to the source communication terminal 100 is different from a further next stage IP address of the address bundle 221 corresponding to the destination communication terminal 100, by the operation of the address determining part 103 provided for the source communication terminal 100, the further next stage IP address of the address bundle corresponding to the destination communication terminal 100 is determined to be the IP address which is used for the source communication terminal 100 to communicate with the destination communication terminal 100 (the step S107). Then, after the IP address determined in the step S107 is set as the destination address, the data is transmitted from the source communication terminal 100 to the destination communication terminal 100 (the step S104).

On the other hand, as a result of the judgment in the step S105, if it is judged that there is no further next stage IP address in each of the address bundle 221 corresponding to the source communication terminal 100 and the address bundle 221 corresponding to the destination communication terminal 100 (the step S105: No), by the operation of the address determining part 103 provided for the source communication terminal 100, the IP address at the left end of the address bundle 221 corresponding to the destination communication terminal 100 is determined to be the IP address which is used for the source communication terminal 100 to communicate with the destination communication terminal 100 (step S108). This operation is preferably performed if there is a possibility that the NAT router 300 is a hairpin support router.

Then, under the control of the CPU 100 provided for the source communication terminal 100, after the IP address determined in the step S108 is set as the destination address, it is judged whether or not the data can be transmitted from the source communication terminal 100 to the destination communication terminal 100 (step S109). If the NAT router 300 is a hairpin support router, the data could be transmitted.

As a result of the judgment in the step S109, if it is judged that the data can be transmitted from the source communication terminal 100 to the destination communication terminal 100 (the step S109: Yes), the data transmission is continued (the step S104). On the other hand, as a result of the judgment in the step S109, if it is judged that the data cannot be transmitted from the source communication terminal 100 to the destination communication terminal 100 (the step S109: No), the operations are ended without the data transmission.

Here, for clearer explanation, an explanation will be given on an operation example in which the data is transmitted to each of the communication terminal 100a, the communication terminal 100b, the communication terminal 100d, and the communication terminal 100e from the communication terminal 100c included in the communication system 1 shown in FIG. 1.

(2-1) Data Transmission from Communication Terminal 100c to Communication Terminal 100a If the data is transmitted from the communication terminal 100c to the communication terminal 100a, the communication terminal 100c presents the host name "A" of the communication terminal 100a to the address resolution server 200, thereby obtaining from the address resolution server 200 each of the address bundle 221 corresponding to the communication terminal 100c and the address bundle 221 corresponding to the communication terminal 100a.

Then, the communication terminal 100c compares the IP address "123.45.67.89" at the left end of the address bundle 221 corresponding to the communication terminal 100c with the IP address "98.76.54.32" at the left end of the address bundle 221 corresponding to the communication terminal 100a. As a result, since the IP address "123.45.67.89" at the left end of the address bundle 221 corresponding to the communication terminal 100c and the IP address "98.76.54.32" at the left end of the address bundle 221 corresponding to the communication terminal 100a, are different IP addresses, the communication terminal 100c determines the IP address "98.76.54.32" at the left end of the address bundle 221 corresponding to the communication terminal 100a to be the IP address which is used for the communication terminal 100c to communicate with the communication terminal 100a. Moreover, the communication terminal 100c determines the port number "55555" corresponding to the IP address at the left end of the address bundle 221 corresponding to the communication terminal 100a to be a destination port number which is used for the communication terminal 100c to communicate with the communication terminal 100a.

Then, the communication terminal 100c sets the IP address of "98.76.54.32" as the destination address and sets the port number of "55555" as the destination port number, and then transmits the data to the communication terminal 100a. As a result, the data transmitted from the communication terminal 100c arrives at the communication terminal 100a via the NAT router 300b and the NAT router 300a. Therefore, the data is preferably transmitted from the communication terminal 100c to the communication terminal 100a.

(2-2) Communication Between Communication Terminal 100c and Communication Terminal 100b If the data is transmitted from the communication terminal 100c to the communication terminal 100b, the communication terminal 100c presents the host name "B" of the communication terminal 100b to the address resolution server 200, thereby obtaining from the address resolution server 200 each of the address bundle 221 corresponding to the communication terminal 100c and the address bundle 221 corresponding to the communication terminal 100b.

Then, the communication terminal 100c compares the IP address "123.45.67.89" at the left end of the address bundle 221 corresponding to the communication terminal 100c with the IP address "123.45.67.89" at the left end of the address bundle 221 corresponding to the communication terminal 100b. As a result, since the IP address "123.45.67.89" at the left end of the address bundle 221 corresponding to the communication terminal 100c and the IP address "123.45.67.89" at the left end of the address bundle 221 corresponding to the communication terminal 100b are the same IP address, the communication terminal 100c compares next stage IP addresses. Specifically, the communication terminal 100c compares the second-stage IP address "192.168.0.2" of the address bundle 221 corresponding to the communication terminal 100c with the second-stage IP address "192.168.0.3" of the address bundle 221 corresponding to the communication terminal 100b. As a result, since the second-stage IP address "192.168.0.2" of the address bundle 221 corresponding to the communication terminal 100c and the second stage IP address "192.168.0.3" of the address bundle 221 corresponding to the communication terminal 100b are different IP addresses, the communication terminal 100c determines the second-stage IP address "192.168.0.3" of the address bundle 221 corresponding to the communication terminal 100b to be the IP address which is used for the communication terminal 100c to communicate with the communication terminal 100b. Moreover, the communication terminal 100c determines the port number "54321" corresponding to the second-stage IP address of the address bundle 221 corresponding to the communication terminal 100b to be a destination port number used for the communication terminal 100c to communicate with the communication terminal 100b.

Then, the communication terminal 100c sets the IP address of "192.168.0.3" as the destination address and sets the port number of "54321" as the destination port number, and then transmits the data to the communication terminal 100b. As a result, the data transmitted from the transmission terminal 100c arrives at the communication terminal 100b via the NAT router 300b. Therefore, the data is preferably performed from the communication terminal 100c to the communication terminal 100b.

Incidentally, in a communication system provided with a so-called existing DNS server, the IP address of the communication terminal 100b obtained by presenting the host name "B" of the communication terminal 100b to the DNS server is "123.45.67.89" which is the global IP address on the WAN side of the NAT router 300a for directly connecting the local network 402a, to which the communication terminal 100b belongs, and the global network 401. In this case, the communication terminal 100c sets the IP address of "123.45.67.89" as the destination address and then transmits the data to the communication terminal 100b. However, although the data arrives at the NAT router 300a, the data is not forwarded from the NAT router 300a to the communication terminal 100b. Therefore, in the communication system provided with the existing DNS server, in order to transmit the data from the communication terminal 100c to the communication terminal 100b, as explained in the back ground, it is necessary to provide the DNS server or a relay center which is special hardware in each local network 402.

However, in the example, as described above, without providing the DNS server or the relay center which is special hardware in each local network 402, the data can be transmitted from the communication terminal 100c to the communication terminal 100b. More specifically, the aforementioned operations can be performed by incorporating software for operating as the address resolution server 200 described above to the existing DNS server and by incorporating software for operating as the communication terminal 100 described above to the existing communication terminal. Thus, it is possible to receive such a practically useful effect that there is no need to introduce new hardware to the existing communication system. In other words, it is possible to receive such a practically useful effect that the communication terminal 100 for performing the aforementioned operations and the address resolution server 200 can be introduced at low cost.

(2-3) Communication Between Communication Terminal 100c and Communication Terminal 100d If the data is transmitted from the communication terminal 100c to the communication terminal 100d, the communication terminal 100c presents the host name "D" of the communication terminal 100d to the address resolution server 200, thereby obtaining from the address resolution server 200 each of the address bundle 221 corresponding to the communication terminal 100c and the address bundle 221 corresponding to the communication terminal 100d.

Then, the communication terminal 100c compares the IP address "123.45.67.89" at the left end of the address bundle 221 corresponding to the communication terminal 100c with the IP address "123.45.67.89" at the left end of the address bundle 221 corresponding to the communication terminal 100d. As a result, since the IP address "123.45.67.89" at the left end of the address bundle 221 corresponding to the communication terminal 100c and the IP address "123.45.67.89" at the left end of the address bundle 221 corresponding to the communication terminal 100d are the same IP address, the communication terminal 100c compares next stage IP addresses. Specifically, the communication terminal 100c compares the second-stage IP address "192.168.0.2" of the address bundle 221 corresponding to the communication terminal 100c with the second stage IP address "192.168.0.2" of the address bundle 221 corresponding to the communication terminal 100d. As a result, since "the second stage IP address "192.168.0.2" of the address bundle 221 corresponding to the communication terminal 100c and "the second stage IP address "192.168.0.2" of the address bundle 221 corresponding to the communication terminal 100d are the same IP address, the communication terminal 100c compares further next stage IP addresses. Specifically, the communication terminal 100c compares the third-stage IP address "192.168.1.99" of the address bundle 221 corresponding to the communication terminal 100c with the third-stage IP address "192.168.1.100" of the address bundle 221 corresponding to the communication terminal 100d. As a result, since the third-stage IP address "192.168.1.99" of the address bundle 221 corresponding to the communication terminal 100c and the third-stage IP address "192.168.1.100" of the address bundle 221 corresponding to the communication terminal 100d are different IP addresses, the communication terminal 100c determines the third-stage IP address "192.168.1.100" of the address bundle 221 corresponding to the communication terminal 100d to be the IP address which is used for the communication terminal 100c to communicate with the communication terminal 100d. Moreover, the communication terminal 100c determines the port number "54321" corresponding to the third stage IP address of the address bundle 221 corresponding to the communication terminal 100d to be a destination port number used for the communication terminal 100c to communicate with the communication terminal 100d.

Then, the communication terminal 100c sets the IP address of "192.168.1.100" as the destination address and sets the port number of "54321" as the destination port number, and then transmits the data to the communication terminal 100d. As a result, the data transmitted from the communication terminal 100c directly arrives at the communication terminal 100d.

Incidentally, in the communication system provided with the so-called existing DNS server, the IP address of the communication terminal 100d obtained by presenting the host name "D" of the communication terminal 100d to the DNS server is "123.45.67.89" which is the global IP address on the WAN side of the NAT router 300a for indirectly connecting the local network 402b, to which the communication terminal 100d belongs, and the global network 401. In this case, the communication terminal 100c sets the IP address of "123.45.67.89" as the destination address and then transmits the data to the communication terminal 100d. However, although the data arrives at the NAT router 300a, the data is not forwarded to the communication terminal 100d from the NAT router 300a. However, in the example, as described above, without providing the DNS server or the relay center which is special hardware in each local network 402, the data can be transmitted from the communication terminal 100c to the communication terminal 100d. In other words, it is possible to receive such a practically useful effect that the communication terminal 100 for performing the aforementioned operations and the address resolution server 200 can be introduced at low cost.

(2-4) Communication Between Communication Terminal 100c and Communication Terminal 100e If the data is transmitted from the communication terminal 100c to the communication terminal 100e, the communication terminal 100c presents the host name "E" of the communication terminal 100e to the address resolution server 200, thereby obtaining from the address resolution server 200 each of the address bundle 221 corresponding to the communication terminal 100c and the address bundle 221 corresponding to the communication terminal 100e.

Then, the communication terminal 100c compares the IP address "123.45.67.89" at the left end of the address bundle 221 corresponding to the communication terminal 100c with the IP address "123.45.67.89" at the left end of the address bundle 221 corresponding to the communication terminal 100e. As a result, since the IP address "123.45.67.89" at the left end of the address bundle 221 corresponding to the communication terminal 100c and the IP address "123.45.67.89" at the left end of the address bundle 221 corresponding to the communication terminal 100e are the same IP address, the communication terminal 100c compares next stage IP addresses. Specifically, the communication terminal 100c compares the second-stage IP address "192.168.0.2" of the address bundle 221 corresponding to the communication terminal 100c, with the second-stage IP address "192.168.0.9" of the address bundle 221 corresponding to the communication terminal 100e. As a result, since the second-stage IP address "192.168.0.2" of the address bundle 221 corresponding to the communication terminal 100c and the second-stage IP address "192.168.0.9" of the address bundle 221 corresponding to the communication terminal 100e are different IP addresses, the communication terminal 100c determines the second-stage IP address "192.168.0.9" of the address bundle 221 corresponding to the communication terminal 100e to be the IP address which is used for the communication terminal 100c to communicate with the communication terminal 100e. Moreover, the communication terminal 100c determines the port number "33333" corresponding to the second-stage IP address of the address bundle 221 corresponding to the communication terminal 100e to be a destination port number used for the communication terminal 100c to communicate with the communication terminal 100e.

Then, the communication terminal 100c sets the IP address of "192.168.0.9" as the destination address and sets the port number of "33333" as the destination port number, and then transmits the data to the communication terminal 100e. As a result, the data transmitted from the communication terminal 100c arrives at the communication terminal 100e via the NAT router 30b and the NAT router 300c.

Incidentally, in the communication system provided with the so-called existing DNS server, the IP address of the communication terminal 100e obtained by presenting the host name "E" of the communication terminal 100e to the DNS server is "123.45.67.89" which is the global IP address on the WAN side of the NAT router 300a for indirectly connecting the local network 402c, to which the communication terminal 100e belongs, and the global network 401. In this case, the communication terminal 100c sets the IP address of "123.45.67.89" as the destination address and then transmits the data to the communication terminal 100e. However, although the data arrives at the NAT router 300a, the data is not forwarded to the communication terminal 100e from the NAT router 300a. However, in the example, as described above, without providing the DNS server or the relay center which is special hardware in each local network 402, the data can be transmitted from the communication terminal 100c to the communication terminal 100e. In other words, it is possible to receive such a practically useful effect that the communication terminal 100 for performing the aforementioned operations and the address resolution server 200 can be introduced at low cost.

(3) Method of Examining/Registering Address Bundle

Next, with reference to FIG. 6 to FIG. 8, an explanation will be given on methods of examining/registering the address bundle 221 which is stored in the address administration table 201 provided for the address resolution server 200.

(3-1) First Examination/Registration Method

Firstly, with reference to FIG. 6, an explanation will be given on a first method of examining/registering the address bundle 221 which is stored in the address administration table 201 provided for the address resolution server 200. FIG. 6 is a block diagram conceptually showing the basic structure of a communication terminal 100-1 for performing the first method of examining/registering the address bundle 221. Incidentally, the same component as that of the communication terminal 100 described above will carry the same reference numeral, and the detailed explanation thereof will be omitted.

Figure 6:
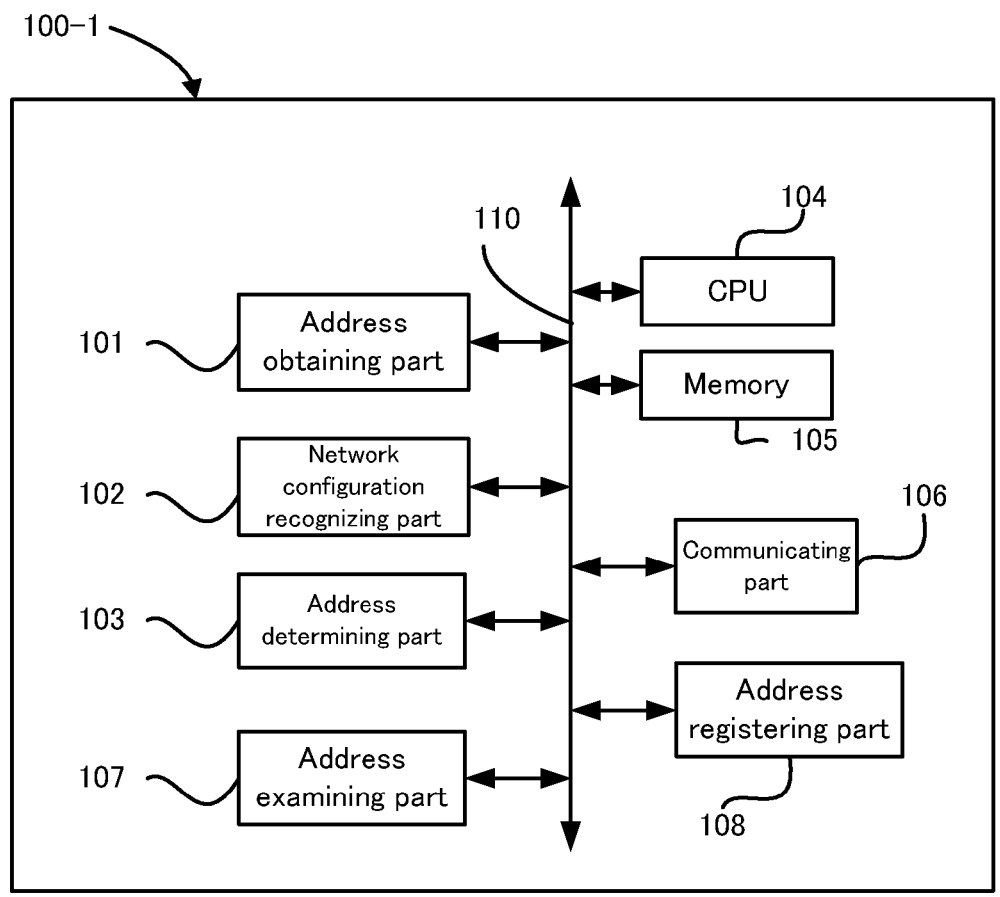
FIG. 6 is a block diagram conceptually showing the basic structure of a communication terminal for performing a first method of examining/registering an address bundle.

As shown in FIG. 6, the communication terminal 100-1 is provided with the address obtaining part 101, the network configuration recognizing part 102, the address determining part 103, the CPU 104, the memory 105, and the communicating part 106, same as in the communication terminal 100 described above.

The communication terminal 100-1 is provided particularly with: an address examining part 107 which constitutes one specific example of the "examining device" of the present invention; and an address registering part 108 which constitutes one specific example of the "registering device" of the present invention, in order to perform the first method of examining/registering the address bundle 221.

Here, in performing the first examination/registration method, it is assumed that the NAT router 300 included in the communication system 1 is a Universal Plug and Play (UPnP) support router. In other words, if the NAT router 300 included in the communication system 1 is the Universal Plug and Play (UPnP) support router, it is possible to examine the address bundle 221 and store (i.e. register) the address bundle 221 obtained as a result of the examination in the address administration storing part 201 by performing the first examination/ registration method. Therefore, hereinafter, the explanation will be given on the premise that the NAT router 300 included in the communication system 1 is the Universal Plug and Play (UPnP) support router.

In this case, the address examining part 107 performs the following operations. Firstly, the address examining part 107 executes a "traceroute" command in which the IP address of the address resolution server 200 is set as an argument. As a result, the address examining part 107 can obtain the LAN side IP address of the NAT router 300 which exists in a network route from the global network 401, to which the address resolution server 200 belongs, to the communication terminal 100-1.

Then, the address examining part 107 obtains the WAN side IP address of the NAT router 300 which is on the side closest to the communication terminal 100-1 (hereinafter, the NAT router 300 which is the n-th closest to the communication terminal 100-1 will be referred to as an "n-th stage NAT router 300" as occasion demands) by using UPnP. Moreover, when obtaining the WAN side IP address of the NAT router 300, the address examining part 107 may simultaneously set the static routing of the NAT router 300 such that a request from the upper side of the NAT router 300 arrives at the communication terminal 100-1.

If there is only one NAT router 300 that exists in the network route from the global network 401, to which the address resolution server 200 belongs, to the communication terminal 100-1, the WAN side IP address of the first stage NAT router 300 obtained by the aforementioned operations and the IP address of the communication terminal 100-1 are converted to the form of the address bundle 221 described above, by the operation of the address registering part 108. Then, by the operation of the address registering part 108, the address bundle 221 is transmitted to the address resolution server 200. As a result, the address bundle 221 transmitted to the address resolution server 200 is stored in the address administration table storing part 201 as one portion of the address administration table 220.

On the other hand, if there are a plurality of NAT routers 300 in the network route from the global network 401, to which the address resolution server 200, belongs to the communication terminal 100-1, the following operations are continuously performed in addition to the aforementioned operations.

Then, the address examining part 107 changes the operating mode of the first stage NAT router 300 from a router mode to a bridge mode. As a result, the state of the communication terminal 100-1 changes from a state in which the first stage NAT router 300 belongs to a network (e.g. local network) which is a boundary with another network to a state in which the second stage NAT router 300, located one more upper stage than the first stage NAT router 300, belongs to the network which is the boundary with another network. In other words, the network to which the communication terminal 100-1 and the first stage NAT router 300 belong is integrated with the network to which the second stage NAT router 300 belongs.

Then, the address examining part 107 obtains from the second stage NAT router 300 the IP address of the communication terminal 100-1 in the network to which the second stage NAT router 300 belongs, by using a Dynamic Host Configuration Protocol (DHCP). This makes it possible for the communication terminal 100-1 to have access in the network to which the second stage NAT router 300 belongs.

Then, as a result, the address examining part 107 obtains the WAN side IP address of the second stage NAT router 300 by using a UPnP command. Moreover, when obtaining the WAN side IP address of the NAT router 300, the address examining part 107 may simultaneously set the static routing of the NAT router 300 such that a request from the upper side of the NAT router 300 arrives at the communication terminal 100-1.

After that, if there is a (k+1)-th stage NAT router 300 which is one more upper stage than a k-th NAT router 300 (wherein k is an integer of 2 or more), the address examining part 107 changes the operating mode of the k-th stage NAT router 300 from the router mode to the bridge mode, obtains from the (k+1)-th stage NAT router 300 the IP address of the communication terminal 100-1 in a network to which the (k+1)-th stage NAT router 300 belongs by using the DHCP, and executes the UPnP command, thereby obtaining the WAN side IP address of the (k+1)-th stage NAT router 300.

On the other hand, if there is no third stage NAT router 300 which is one more upper stage than the second stage NAT router 300, the address examining part 107 changes the operating mode of the first stage NAT router 300 from the bridge mode to the router mode. In the same manner, if there is no (k+1)-th stage NAT router 300 which is one more upper stage than the k-th stage NAT router (wherein k is an integer of 2 or more), the address examining part 107 changes the operating mode of each of the (k−1)-th to first stage NAT routers 300 from the bridge mode to the router mode.

Then, the address examining part 107 obtains from the first stage NAT router 300 the IP address of the communication terminal 100-1 in the network to which the first stage NAT router 300 belongs by using the DHCP. Then, the address examining part 107 obtains the IP address of the communication terminal 100-1 by using an "ipconfig" command.

By the operations as described above, the address examining part 107 can obtain the IP address of the communication terminal 100-1 and the WAN side IP address of each of the one or plurality of NAT routers 300 that exist in the network route from the global network 401, to which the address resolution server 200 belongs, to the communication terminal 100-1. The IP address of the communication terminal 100-1 and the WAN side IP address of each of the one or plurality of NAT routers 300 obtained as described above are converted to the form of the address bundle 221 described above, by the operation of the address registering part 108. Then, by the operation of the address registering part 108, the address bundle 221 is transmitted to the address resolution server 200. As a result, the address bundle 221 transmitted to the address resolution server 200 is stored in the address administration table storing part 201 as one portion of the address administration table 220.

Incidentally, the aforementioned explanation was given on an example in which the WAN side IP address is obtained in order from the NAT router 300 located closer to the communication terminal 100-1. However, the WAN side IP address may be obtained in order from the NAT router 300 located farther from the communication terminal 100-1 (in other words, located closer to the global network 401).

Specifically, if there are k NAT routers between the communication terminal 100-1 and the global network 401, the WAN side IP address of each of the k NAT routers 300 may be obtained by the following operations. In this case, firstly, the address examining part 107 executes the "traceroute" command in which the IP address of the address resolution server 200 is set as an argument. Then, the address examining part 107 changes the operating mode of each of the first stage NAT router 300 to the (k−1)-th stage NAT router 300 from the router mode to the bridge mode. Then, the address examining part 107 obtains from the k-th stage NAT router 300 the IP address of the communication terminal 100-1 in a network to which the k-th NAT router 300 belongs by using the Dynamic Host Configuration Protocol (DHCP). Then, the address examining part 107 obtains the WAN side IP address of the k-th stage NAT router 300 by using the UPnP command. Then, the address examining part 107 changes the operating mode of the (k−1)-th stage NAT router 300 from the bridge mode to the router mode. Then, the address examining part 107 obtains from the (k−1)-th stage NAT router 300 the IP address of the communication terminal 100-1 in a network to which the (k−1)-th stage NAT router 300 belongs, by using the Dynamic Host Configuration Protocol (DHCP). Then, the address examining part 107 obtains the WAN side IP address of the (k−1)-th stage NAT router 300 by using the UPnP command. After that, such operations are repeated until the operating mode of the first stage NAT router 300 is changed to the router mode. As a result, the address examining part 107 can obtain the IP address of the communication terminal 100-1 and the WAN side IP address of each of the one or plurality of NAT routers 300 which exist in the network route from the global network, to which the address resolution server 200 belongs, to the communication terminal 100-1.

Incidentally, the aforementioned various commands (e.g. the "traceroute" command and the "ipconfig" command) are merely one example, and another command (e.g. a "tracert" command and a "tracepath" command, etc.) for realizing the same function as that of those commands may be used. Alternatively, instead of executing those commands, a specific processing part for realizing the same function as that of the commands may be mounted on the communication terminal 100-1. In any case, by using some processing part for realizing the aforementioned operations, it is possible to preferably examine and register the address bundle 221.

Here, for clearer explanation, an explanation will be given on an operation example in which the communication terminal 100c included in the communication system 1 shown in FIG. 1 has the configuration shown in FIG. 6 and in which the communication terminal 100c (i.e. 100-1c) examines and registers the address bundle 221.

Firstly, the address examining part 107 provided for the communication terminal 100-1c executes the "traceroute" command in which the IP address of the address resolution server 200 is set as an argument. As a result, the address examining part 107 can obtain the LAN side IP address of the NAT router 300 which exits in a network route from the global network, to which the address resolution server 200 belongs, to the communication terminal 100-1c. In other words, the address examining part 107 obtains the local IP address "192.168.0.1" on the LAN side of the NAT router 300a and the local IP address "192.168.1.1" on the LAN side of the NAT router 300b.

Then, the address examining part 107 obtains the local IP address "192.168.0.2" on the WAN side of the first stage NAT router 300b by using the UPnP command.

Then, the address examining part 107 changes the operating mode of the first stage NAT router 300b from the router mode to the bridge mode. As a result, the local network 402b, to which the communication terminal 100-1c, the communication terminal 100d and the first stage NAT router 300b belong, is integrated with the local network 402a, to which the communication terminal 100b and the second stage NAT router 300a belong.

Then, the address examining part 107 obtains the local IP address of the communication terminal 100-1c in the local network 402a by using the DHCP. Then, the address examining part 107 obtains the global IP address "123.45.67.89" on the WAN side of the second stage NAT router 300a by using the UPnP command.

Then, the address examining part 107 changes the operating mode of the first stage NAT router 300b from the bridge mode to the router mode. Then, the address examining part 107 obtains the local IP address of the communication terminal 100-1 in the local network 402b by using the DHCP. Then, the address examining part 107 obtains the local IP address "192.168.1.99" of the communication terminal 100-1c by using the "ipconfig" command.

By the operations as described above, the address examining part 107 provided for the communication terminal 100-1c can obtain the global IP address "123.45.67.89" on the WAN side of the NAT router 300a, the local IP address "192.168.0.2" on the WAN side of the NAT router 300b and the local IP address "192.168.1.99" of the communication terminal 100-1c. As a result, the address bundle 221 can be certainly registered in the address administration table storing part 201 provided for the address resolution server 200.

As described above, according to the first examination/registration method, the communication terminal 100-1 itself can obtain the address bundle 221. As a result, it is possible to register the address bundle 221 in the address administration table storing part 201 provided for the address resolution server 200.

(3-2) Second Examination/Registration Method

Next, with reference to FIG. 7, an explanation will be given on a second method of examining/registering the address bundle 221 which is stored in the address administration table storing part 201 provided for the address resolution server 200. FIG. 7 are data structure diagrams conceptually showing the address administration table 220 including the address bundle 221 obtained as a result of performing the second examination/registration method.

All the NAT routers 300 that exist in the existing network are not necessarily the UPnP support routers. In this case, it can be considered that it is hard to obtain all the WAN side IP addresses of the one or plurality of NAT routers 300 which exist in the network route from the global network 401, to which the address resolution server 200 belongs, to the communication terminal 100-1 by using the first examination/registration method.

Therefore, if the NAT routers 300 include a UPnP non-support router, as shown in FIG. 7(a), the Media Access Control (MAC) address of the communication terminal 100 may be included in the address bundle 221. Alternatively, as shown in FIG. 7(b), the LAN side IP address of the NAT router 300 may be included in the address bundle 221. Incidentally, in FIG. 7(b), the WAN side IP address of the NAT router 300 is distinguished the LAN side IP address of the NAT router 300 by putting the LAN side IP address of the NAT router 300 in a bracket.

In this case, the aforementioned effect can be received appropriately. Incidentally, if the address bundle 221 includes the LAN side IP address of the NAT router 300 and the MAC address, the communication terminal 100 preferably operates in accordance with a flow obtained by slightly changing the flowchart shown in FIG. 5. The operations will be detailed later (refer to FIG. 9, etc.).

Incidentally, even if the NAT router 300 includes the UPnP support router, it is obvious that the Media Access Control (MAC) address of the communication terminal 100 and the LAN side IP address of the NAT router 300 may be included in the address bundle 221.

(3-3) Third Examination/Registration Method

Next, with reference to FIG. 8, an explanation will be given on a third method of examining/registering the address bundle 221 which is stored in the address administration table storing part 201 provided for the address resolution server 200. FIG. 8 is a block diagram conceptually showing the basic configuration of a communication system 2 for performing the third examination/registration method.

All the NAT routers 300 that exist in the existing network are not necessarily the UPnP support routers. In this case, it can be considered that it is hard to obtain all the WAN side IP addresses of the one or plurality of NAT routers 300 which exist in the network route from the global network 401 to which the address resolution server 200 belongs to the communication terminal 100 by using the first examination/registration method.

Figure 8:
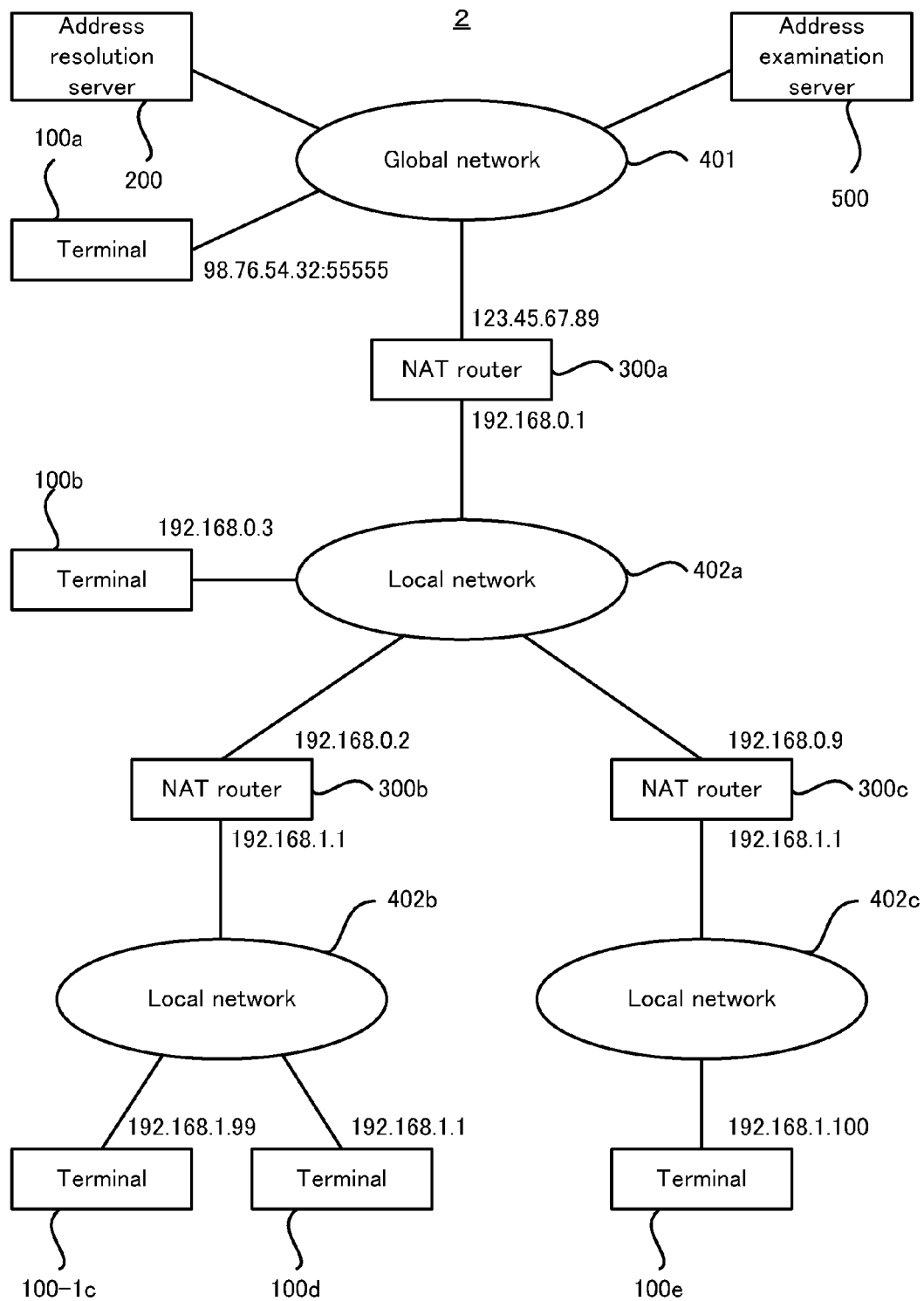
FIG. 8 is a block diagram conceptually showing the basic configuration of a communication system for performing a third examination/registration method.

Therefore, if the NAT routers 300 include a UPnP non-support router, as shown in FIG. 8, for the communication system 2, an address examination server 500 capable of obtaining the WAN side IP address (in other words, the global IP address of the communication terminal 100c-1) of the most upper stage NAT router 300 (i.e. the NAT router 300 which belongs to the global network 401) out of the one or plurality of NAT routers 300 which exist in the network route from the global network 401, to which the address resolution server 200 belongs, to the communication terminal 100 may be newly provided on the global network 401 (in other words, on the network to which the address resolution server 200 belongs).

Here, for clearer explanation, an explanation will be given on an operation example in which the communication terminal 100c included in the communication system 1 shown in FIG. 8 examines and registers the address bundle 221 by using the address examination server 500.

Firstly, the address examining part 107 provided for the communication terminal 100-1c executes the "traceroute" command in which the IP address of the address resolution server 200 is set as an argument. As a result, the address examining part 107 can obtain the LAN side IP address of the NAT router 300 which exists in the network route from the global network 401, to which the address resolution server 200 belongs, to the communication terminal 100-1c. In other words, the address examining part 107 obtains the local IP address "192.168.0.1" on the LAN side of the NAT router 300a and the local IP address "192.168.1.1" on the LAN side of the NAT router 300b.

Then, the address examining part 107 obtains the local IP address "192.168.1.99" of the communication terminal 100-1c by using the "ipconfig" command.

Then, the address examining part 107 inquires of the address examination server 500, thereby obtaining the global IP address of the communication terminal 100c-1 (i.e. the global IP address on the WAN side of the most upper stage NAT router 300). Because the address examination server 500 receives such a request, the address examination server 500 preferably obtains the global IP address on the WAN side of the NAT router 300a.

By the operations as described above, the address examining part 107 provided for the communication terminal 100-1c can obtain the global IP address "123.45.67.89" on the WAN side of the NAT router 300a the local IP address "192.168.1.1" on the LAN side of the NAT router 300b, and the local IP address "192.168.1.99" of the communication terminal 100-1c. As a result, the address bundle 221 shown in FIG. 7(b) is generated.

As described above, according to the third examination/registration method, the address bundle 221 can be obtained by using the address examination server 500. As a result, it is possible to register the address bundle 221 in the address administration table storing part 201 provided for the address resolution server 200.

Incidentally, in the example shown in FIG. 8, an explanation was given on an example in which the address examination server 500 is provided independently. However, instead of independently providing the address examination server 500, a functional block for performing the same operations as those of the address examination server 500 may be added to the address resolution server 200.

Alternatively, the functional block for performing the same operations as those of the address examination server 500 may be added to the communication terminal 100. In this case, for example, the communication terminal 100 which is about to examine and register the address bundle 221 inquires of another communication terminal 100 other than the communication terminal 100 itself, thereby obtaining the global IP address on the WAN side of the NAT router 300 located between the another communication terminal 100 and the communication terminal 100.

(3-4) Fourth Examination/Registration Method

Next, an explanation will be given on a fourth method of examining/registering the address bundle 221 which is stored in the address administration table storing part 201 provided for the address resolution server 200.

The aforementioned explanation was given on the operation for generating the address bundle 221 by the operations of the communication terminal 100. However, in the general NAT router 300, a user can examine the WAN side IP address of the NAT router 300 by using a setting screen for the NAT router using a WEB browser or the like. Thus, considering the presence of the setting screen for the NAT router as described above, the user of the communication terminal 100 may obtain the WAN side IP address of each of the one or plurality of NAT routers 300 which exist in the network route from the global network 401 to which the address resolution server 200 belongs to the communication terminal 100.

(3-5) Operation Example in the Case where LAN Side Address and MAC Address are Registered As describe above, if the address bundle 221 includes the MAC address and the LAN side IP address of the NAT router 300, the communication terminal 100 preferably operates in accordance with a flow which is different from the flowchart shown in FIG. 5. This operation will be explained with reference to FIG. 9 to FIG. 12. FIG. 9 to FIG. 12 are flowcharts conceptually showing the operations of the communication system 1 if the address bundle 221 includes the MAC address and the LAN side IP address of the NAT router 300. Incidentally, the same operation as that of the flowchart shown in FIG. 5 will carry the same reference numeral, and the detailed explanation thereof will be omitted.

Figure 9:
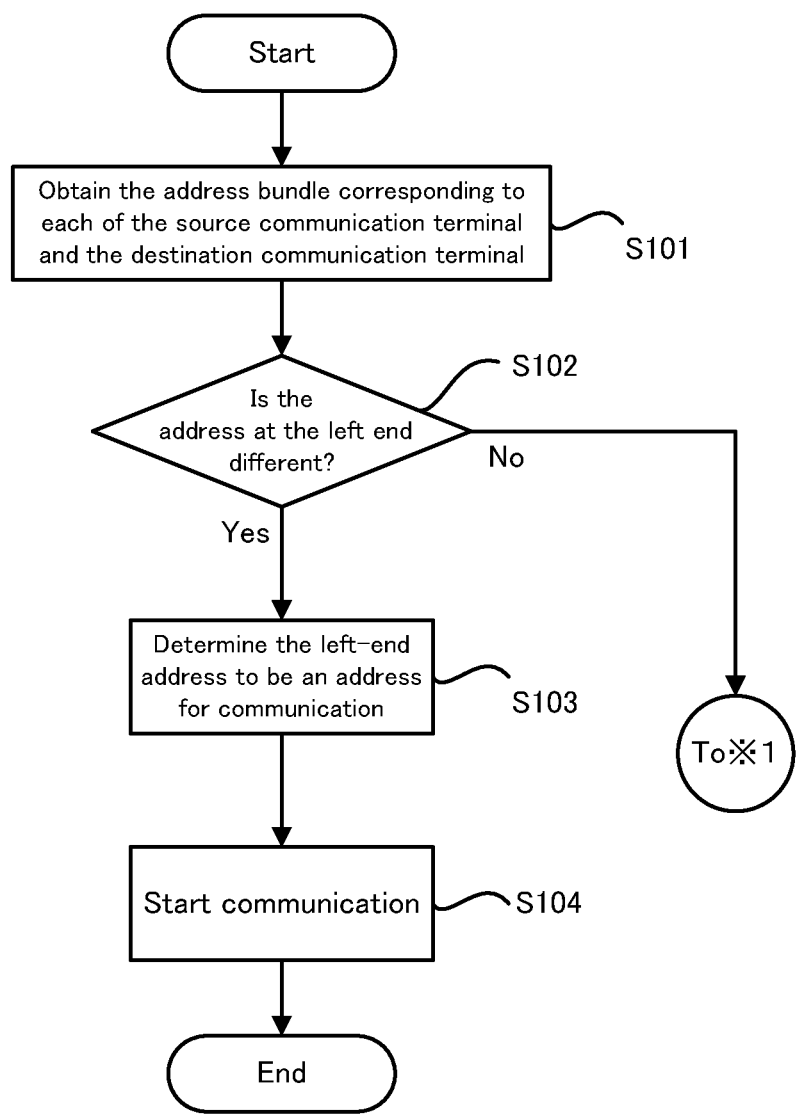
FIG. 9 is a flowchart conceptually showing the operations of the communication system if the address bundle includes a MAC address and a LAN side IP address of an NAT router.

As shown in FIG. 9, firstly, by the operation of the address obtaining part 101 provided for the source communication terminal 100, each of the address bundle 221 corresponding to the source communication terminal 100 and the address bundle 221 corresponding to the destination communication terminal 100 is obtained from the address resolution server 200 (the step S101).

Then, by the operation of the network configuration recognizing part 102 provided for the source communication terminal 100, it is judged whether or not the IP address at the left end of the address bundle 221 corresponding to the source communication terminal 100 obtained in the step S101 is different from the IP address at the left end of the address bundle 221 corresponding to the destination communication terminal 100 obtained in the step S101 (the step S102).

As a result of the judgment in the step S102, if it is judged that the IP address at the left end of the address bundle 221 corresponding to the source communication terminal 100 is different from the IP address at the left end of the address bundle 221 corresponding to the destination communication terminal 100 (the step S102: Yes), by the operation of the address determining part 103 provided for the source communication terminal 100, the IP address at the left end of the address bundle 221 corresponding to the destination communication terminal 100 is determined to be the IP address which is used for the source communication terminal 100 to communicate with the destination communication terminal 100 (the step S103). Then, after the IP address determined in the step S103 is set as the destination address, the data is transmitted from the source communication terminal 100 to the destination communication terminal 100 (the step S104).

Figure 10:
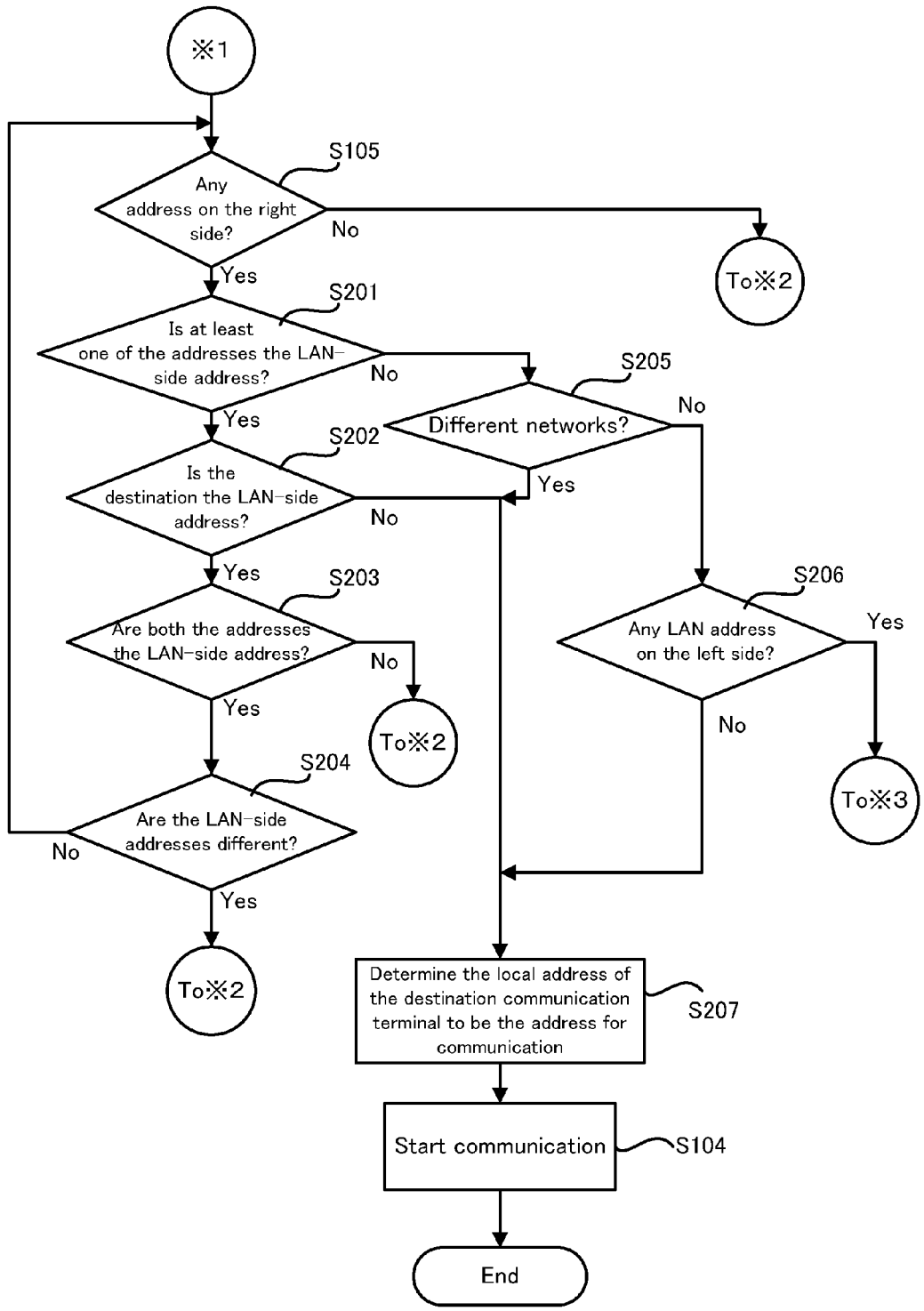
FIG. 10 is a flowchart conceptually showing the operations of the communication system if the address bundle includes the MAC address and the LAN side IP address of the NAT router.

On the other hand, as a result of the judgment in the step S102, if it is judged that the IP address at the left end of the address bundle 221 corresponding to the source communication terminal 100 is equal to the IP address at the left end of the address bundle 221 corresponding to the destination communication terminal 100 (the step S102: No), then, as shown in FIG. 10, by the operation of the network configuration recognizing part 102 provided for the source communication terminal 100, it is judged whether or not there is the next stage IP address (hereinafter, referred to as a "m-th stage IP address (wherein m is an integer of 2 or more)" as occasion demands) in each of the address bundle 221 corresponding to the source communication terminal 100 and the address bundle 221 corresponding to the destination communication terminal 100 (the step S105).

Figure 11:
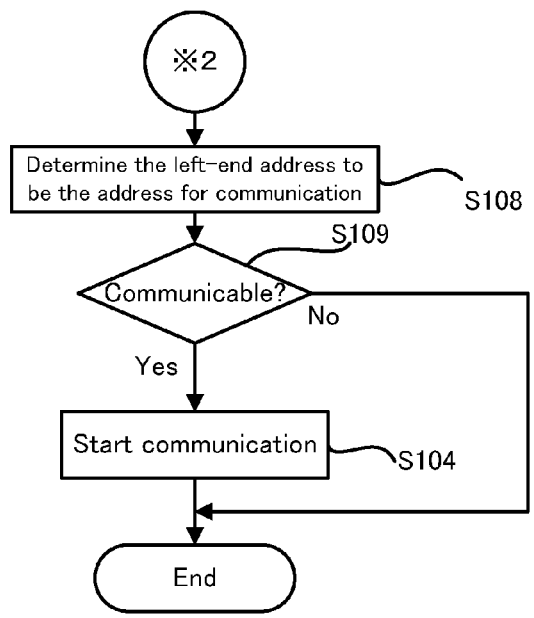
FIG. 11 is a flowchart conceptually showing the operations of the communication system if the address bundle includes the MAC address and the LAN side IP address of the NAT router.

As a result of the judgment in the step S105, if it is judged that there is no m-th stage IP address in each of the address bundle 221 corresponding to the source communication terminal 100 and the address bundle 221 corresponding to the destination communication terminal 100 (the step S105: No), as shown in FIG. 11, by the operation of the address determining part 103 provided for the source communication terminal 100, the IP address at the left end of the address bundle 221 corresponding to the destination communication terminal 100 is determined to be the IP address which is used for the source communication terminal 100 to communicate with the destination communication terminal 100 (the step S108). This operation is preferably performed if there is a possibility that the NAT router 300 is a hairpin support router.

Then, under the control of the CPU 100 provided for the source communication terminal 100, after the IP address determined in the step S108 is set as the destination address, it is judged whether or not the data can be transmitted from the source communication terminal 100 to the destination communication terminal 100 (the step S109). If the NAT router 300 is a hairpin support router, the data can be transmitted.

As a result of the judgment in the step S109, if it is judged that the data can be transmitted from the source communication terminal 100 to the destination communication terminal 100 (the step S109: Yes), the data transmission is continued (the step S104). On the other hand, as a result of the judgment in the step S109, if it is judged that the data cannot be transmitted from the source communication terminal 100 to the destination communication terminal 100 (the step S109: No), the operations are ended without the data transmission.

Back in FIG. 10 again, on the other hand, as a result of the judgment in the step S105, if it is judged that there is the me-th stage IP address in each of the address bundle 221 corresponding to the source communication terminal 100 and the address bundle 221 corresponding to the destination communication terminal 100 (the step S105: Yes), by the operation of the network configuration recognizing part 102 provided for the source communication terminal 100, it is judged whether or not at least one of the m-th stage IP address of the address bundle 221 corresponding to the source communication terminal 100 and the m-th stage IP address of the address bundle 221 corresponding to the destination communication terminal 100 is the LAN side IP address of the NAT router 300 (step S201).

As a result of the judgment in the step S201, if it is judged that at least one of the m-th stage IP address of the address bundle 221 corresponding to the source communication terminal 100 and the m-th stage IP address of the address bundle 221 corresponding to the destination communication terminal 100 is the LAN side IP address of the NAT router 300 (the step S201: Yes), by the operation of the network configuration recognizing part 102 provided for the source communication terminal 100, it is judged whether or not the m-th stage IP address of the address bundle 221 corresponding to the destination communication terminal 100 is the LAN side IP address of the NAT router 300 (step S202).

As a result of the judgment in the step S202, if it is judged that the m-th stage IP address of the address bundle 221 corresponding to the destination communication terminal 100 is not the LAN side IP address of the NAT router 300 (the step S202: No), by the operation of the address determining part 103 provided for the source communication terminal 100, the IP address of the destination communication terminal 100 included in the address bundle 221 corresponding to the destination communication terminal 100 (i.e. the local IP address of the destination communication terminal 100) is determined to be the IP address which is used by the source communication terminal 100 to communicate with the destination communication terminal 100 (step S207). Then, after the IP address determined in the step S207 is set as the destination address, the data is transmitted from the source communication terminal 100 to the destination communication terminal 100 (the step S104).

On the other hand, as a result of the judgment in the step S202, if it is judged that the m-th stage IP address of the address bundle 221 corresponding to the destination communication terminal 100 is the LAN side IP address of the NAT router 300 (the step S202: Yes), by the operation of the network configuration recognizing part 102 provided for the source communication terminal 100, it is judged whether or not both the m-th stage IP address of the address bundle 221 corresponding to the source communication terminal 100 and the m-th stage IP address of the address bundle 221 corresponding to the destination communication terminal 100 are the LAN side IP address of the NAT router 300 (step S203).

As a result of the judgment in the step S203, if it is judged that both the m-th stage IP address of the address bundle 221 corresponding to the source communication terminal 100 and the m-th stage IP address of the address bundle 221 corresponding to the destination communication terminal 100 are not the LAN side IP address of the NAT router 300 (the step S203: No), the operations in the step S108, the step S109, and the step S104 in FIG. 11 are performed. However, here, by using an Address Resolution Protocol (ARP) in which the IP address of the destination communication terminal 100 included in the address bundle 221 corresponding to the destination communication terminal 100 is set as an argument, the MAC address of the destination communication terminal 100 may be obtained. In this case, if the obtained MAC address is equal to the MAC address of the destination communication terminal 100 included in the address bundle 221 corresponding to the destination communication terminal 100, instead of performing the operations in the step S108, the step S109, and the step S104 in FIG. 11, after the IP address of the destination communication terminal 100 (i.e. the local IP address of the destination communication terminal 100) is set as the destination address, the data may be transmitted from the source communication terminal 100 to the destination communication terminal 100 (the step S207).

On the other hand, as a result of the judgment in the step S203, if it is judged that both the m-th stage IP address of the address bundle 221 corresponding to the source communication terminal 100 and the m-th stage IP address of the address bundle 221 corresponding to the destination communication terminal 100 are the LAN side IP address of the NAT router 300 (the step S203: Yes), by the operation of the network configuration recognizing part 102 provided for the source communication terminal 100, it is judged whether or not the m-th stage IP address of the address bundle 221 corresponding to the source communication terminal 100 is different from the m-th IP address of the address bundle 221 corresponding to the destination communication terminal 100 (step S204).

As a result of the judgment in the step S204, if it is judged that the m-th stage IP address of the address bundle 221 corresponding to the source communication terminal 100 is different from the m-th IP address of the address bundle 221 corresponding to the destination communication terminal 100 (the step S204: Yes), the operations in the step S108, the step S109, and the step S104 in FIG. 11 are performed.

On the other hand, as a result of the judgment in the step S204, if it is judged that the m-th stage IP address of the address bundle 221 corresponding to the source communication terminal 100 is equal to the m-th IP address of the address bundle 221 corresponding to the destination communication terminal 100 (the step S204: No), the operational flow returns to the step S105, and the operations after the step S201 are performed with respect to the further next stage IP address included in the address bundle 221.

On the other hand, as a result of the judgment in the step S201, if it is judged that both the m-th stage IP address of the address bundle 221 corresponding to the source communication terminal 100 and the m-th stage IP address of the address bundle 221 corresponding to the destination communication terminal 100 are not the LAN side IP address of the NAT router 300 (the step S201: No), by the operation of the network configuration recognizing part 102 provided for the source communication terminal 100, it is judged whether or not the m-th stage IP address of the address bundle 221 corresponding to the source communication terminal 100 and the m-th stage IP address of the address bundle 221 corresponding to the destination communication terminal 100 belong to different networks (step S205).

As a result of the judgment in the step S205, if it is judged that the m-th stage IP address of the address bundle 221 corresponding to the source communication terminal 100 and the m-th stage IP address of the address bundle 221 corresponding to the destination communication terminal 100 belong to different networks (the step S205: Yes), by the operation of the address determining part 103 provided for the source communication terminal 100, the IP address of the destination communication terminal 100 included in the address bundle 221 corresponding to the destination communication terminal 100 (i.e. the local IP address of the destination communication terminal 100) is determined to be the IP address which is used by the source communication terminal 100 to communicate with the destination communication terminal 100 (the step S207). Then, after the IP address determined in the step S207 is set as the destination address, the data is transmitted from the source communication terminal 100 to the destination communication terminal 100 (the step S104).

On the other hand, as a result of the judgment in the step S205, if it is judged that the m-th stage IP address of the address bundle 221 corresponding to the source communication terminal 100 and the m-th stage IP address of the address bundle 221 corresponding to the destination communication terminal 100 do not belong to different networks (the step S205: No), then, by the operation of the network configuration recognizing part 102 provided for the source communication terminal 100, it is judged whether or not the LAN side address of the NAT router 300 is included in a further previous stage (i.e. the (m−1)-th stage to the first stage) of the address bundle 221 (step S206).

As a result of the judgment in the step S206, if it is judged that the LAN side address of the NAT router 300 is not included in the further previous stage (i.e. the (m−1)-th stage to the first stage) of the address bundle 221 (the step S206: No), by the operation of the address determining part 103 provided for the source communication terminal 100, the IP address of the destination communication terminal 100 included in the address bundle 221 corresponding to the destination communication terminal 100 (i.e. the local IP address of the destination communication terminal 100) is determined to be the IP address which is used by the source communication terminal 100 to communicate with the destination communication terminal 100 (the step S207). Then, after the IP address determined in the step S207 is sets as the destination address, the data is transmitted from the source communication terminal 100 to the destination communication terminal 100 (the step S104).

Figure 12:
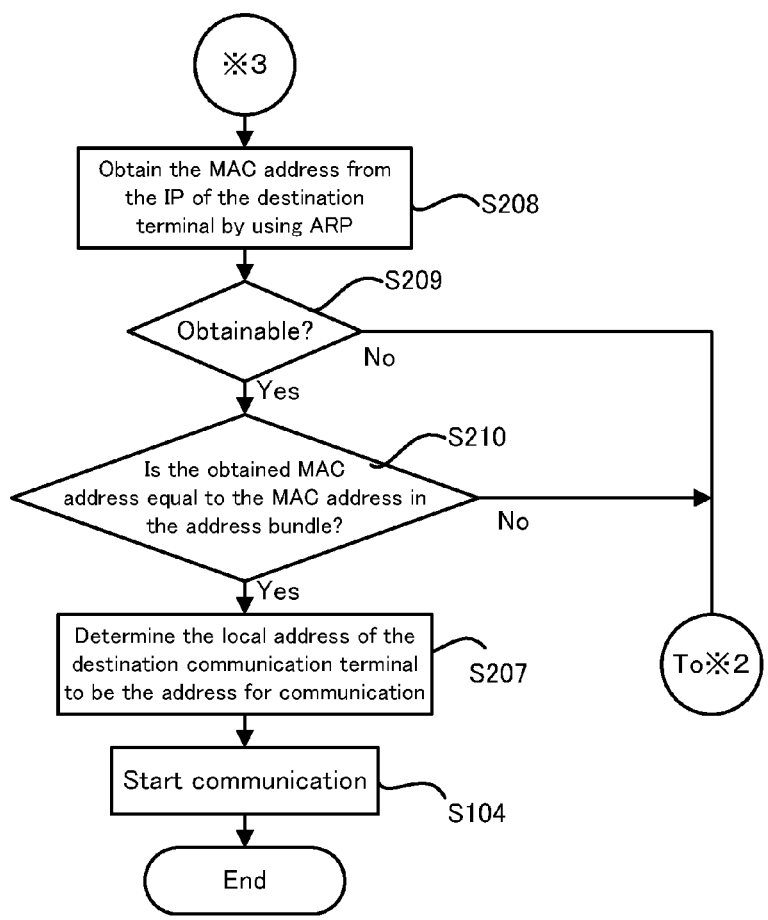
FIG. 12 is a flowchart conceptually showing the operations of the communication system if the address bundle includes the MAC address and the LAN side IP address of the NAT router.

On the other hand, as a result of the judgment in the step S206, if it is judged that the LAN side address of the NAT router 300 is included in the further previous stage (i.e. the (m−1)-th stage to the first stage) of the address bundle 221 (the step S206: Yes), as shown in FIG. 12, by the operation of the network configuration recognizing part 102 provided for the source communication terminal 100, by using the Address Resolution Protocol (ARP) in which the IP address of the destination communication terminal 100 included in the address bundle 221 corresponding to the destination communication terminal 100 is set as an argument, the MAC address of the destination communication terminal 100 is obtained (step S208).

Then, by the operation of the network configuration recognizing part 102 provided for the source communication terminal 100, it is judged whether or not the MAC address of the destination communication terminal 100 is obtained (step S209).

As a result of the judgment in the step S209, if it is judged that the MAC address of the destination communication terminal 100 is not obtained (the step S209: No), the operations in the step S108, the step S109, and the step S104 in FIG. 11 are performed.

On the other hand, as a result of the judgment in the step S209, if it is judged that the MAC address of the destination communication terminal 100 is obtained (the step S209: Yes), by the operation of the network configuration recognizing part 102 provided for the source communication terminal 100, it is judged whether or not the MAC address obtained in the step S208 is equal to the MAC address of the destination communication terminal 100 included in the address bundle 221 corresponding to the destination communication terminal 100 (step S210).

As a result of the judgment in the step S210, if it is judged that the MAC address obtained in the step S208 is not equal to the MAC address of the destination communication terminal 100 included in the address bundle 221 corresponding to the destination communication terminal 100 (the step S210: No), the operations in the step S108, the step S109, and the step S104 in FIG. 11 are performed.

On the other hand, as a result of the judgment in the step S210, if it is judged that the MAC address obtained in the step S208 is equal to the MAC address of the destination communication terminal 100 included in the address bundle 221 corresponding to the destination communication terminal 100 (the step S210: Yes), by the operation of the address determining part 103 provided for the source communication terminal 100, the IP address of the destination communication terminal 100 included in the address bundle 221 corresponding to the destination communication terminal 100 (i.e. the local IP address of the destination communication terminal 100) is determined to be the IP address which is used by the source communication terminal 100 to communicate with the destination communication terminal 100 (the step S207). Then, after the IP address determined in the step S207 is set as the destination address, the data is transmitted from the source communication terminal 100 to the destination communication terminal 100 (the step S104).

By performing the operations as described above, even if the address bundle 221 includes the MAC address and the LAN side IP address of the NAT router 300, it is possible to preferably determine the IP address which is used by the source communication terminal 100 to communicate with the destination communication terminal 100. As a result, it is possible to preferably receive the aforementioned various effects.

The present invention is not limited to the aforementioned example, but various changes may be made, if desired, without departing from the essence or spirit of the invention which can be read from the claims and the entire specification. A communication terminal, an address resolution server, and a computer program, which involve such changes, are also intended to be within the technical scope of the present invention.

DESCRIPTION OF REFERENCE CODES 1 communication system
100 communication terminal
101 address obtaining part
102 network configuration recognizing part
103 address determining part
104 CPU
105 memory
106 communicating part
107 address examining part
108 address registering part
200 address resolution server
201 address administration table storing part
202 address transmitting part
203 CPU
204 memory
205 communicating part
220 address administration table
221 address bundle
300 NAT router
401 global network
402 local network.

The invention claimed is:

1. A communication terminal for communicating with another end terminal which belongs to a same network or which belongs to another network directly or indirectly connected via a router, by using a host name which is unique to the other end terminal, said communication terminal comprising:

an obtaining device configured to present the host name of the other end terminal to an address resolution server, which transmits control information necessary to communicate with the other end terminal, thereby obtaining from the address resolution server a second address bundle indicating a network route from a global network, to which the address resolution server belongs, to the other end terminal as the control information, the second address bundle including a second plurality of addresses;

a recognizing device configured to recognize a positional relation on the network between said communication terminal and the other end terminal, based on the second address bundle obtained by said obtaining device and a first address bundle indicating a network route from the global network, to which the address resolution server belongs, to said communication terminal, the first address bundle including a first plurality of addresses; and a determining device configured to determine a host address, which is used for the communication with the other end terminal, from among the second address bundle obtained by said obtaining device, based on the positional relation on the network between said communication terminal and the other end terminal recognized by said recognizing device.

2. The communication terminal according to claim 1, wherein the first address bundle includes an upper side host address of a router which exists in the network route from the global network, to which the address resolution server belongs, to said communication terminal and a host address of said communication terminal in order of the network route, the second address bundle includes an upper side host address of a router which exists in the network route from the global network, to which the address resolution server belongs, to the other end terminal and a host address of the other end terminal in order of the network route, and said recognizing device recognizes the positional relation on the network between said communication terminal and the other end terminal by comparing a host address included in the first address bundle with a host address included in the second address bundle in order from an upper side to a lower side of the network route.

3. The communication terminal according to claim 2, wherein when a host address at a predetermined hierarchy included in the first address bundle is equal to a host address at the predetermined hierarchy included in the second address bundle, said recognizing device compares a host address at a next hierarchy of the predetermined hierarchy included in the first address bundle with a host address at the next hierarchy of the predetermined hierarchy included in the second address bundle.

4. The communication terminal according to claim 3, wherein when the host address at the predetermined hierarchy included in the first address bundle is different from the host address at the predetermined hierarchy included in the second address bundle, said determining device determines the host address at the predetermined hierarchy included in the second address bundle to be the host address which is used for the communication with the other end terminal.

5. The communication terminal according to claim 1, further comprising:
an examining device configured to examine the network route from the global network, to which the address resolution server belongs, to said communication terminal; and
a registering device configured to register the first address bundle in the address resolution server, based on a result of the examination by said examining device.

6. The communication terminal according to claim 5, wherein
when a router which exists in the network route from the global network, to which the address resolution server belongs, to said communication terminal is a Universal Plug and Play (UPnP) support router, said examining device uses a UPnP command with respect to a lower side host address of a first router, the first router being the router located closest to said communication terminal, and the examining device obtains an upper side host address of the first router, thereby examining the network route from the global network, to which the address resolution server belongs, to said communication terminal, and
said registering device registers, in the address resolution server, an address bundle including the upper side host address of the first router and a host address of said communication terminal on a network to which the first router belongs, which are obtained by said examining device, in order of the network route, as the first address bundle.

7. The communication terminal according to claim 6, wherein
when there is a second router which is the router that belongs to a network on an upper side of the first router, said examining device first
(i) changes an operating mode of the first router to a bridge mode, and obtains a host address of said communication terminal on a network to which the second router belongs from the second router, by using a Dynamic Host Configuration Protocol (DHCP) server,
(ii) uses the UPnP command with respect to a lower side host address of the second router, and obtains an upper side host address of the second router,
(iii) changes the first router into a router mode and returns the host address of said communication terminal on the network to which the first router belongs, into a previous state of a state of (i), and
(iv) uses the UPnP command with respect to the lower side host address of the first router, and obtains the upper side host address of the first router, thereby examining the network route from the global network, to which the address resolution server belongs, to said communication terminal, and
said registering device registers, in the address resolution server, an address bundle further including the upper side host address of the second router obtained by said examining device, as the first address bundle.

8. The communication terminal according to claim 5, wherein
said examining device requests an upper side host address of the router which exists in the network from the global network to which the address resolution server belongs to said communication terminal with respect to an address examination server which belongs to the global network to which the address resolution server belongs, and which examines a network route reaching to said communication terminal, thereby examining the network route from the global network, to which the address resolution server belongs, to said communication terminal, and
said registering device registers an address bundle including the upper side host address obtained from the address examination server and a host address of said communication terminal in order of the network route, as the first address bundle.

9. The communication terminal according to claim 5, wherein said registering device registers an address bundle including a lower side host address of the router and a host address of said communication terminal in order of the network route, as the first address bundle.

10. The communication terminal according to claim 5, wherein said registering device registers an address bundle including a lower side host address of the router, a host address of said communication terminal, and an equipment address which is unique to said communication terminal in order of the network route, as the first address bundle.

11. The communication terminal according to claim 5, wherein
said examining device requests another communication terminal located on an upper side of the router to obtain an upper side host address of the router, and
said registering address registers an address bundle including the upper side host address obtained from the other communication terminal and a host address of said communication terminal in order of the network route, as the first address bundle.

12. The communication terminal according to claim 1, wherein said obtaining device obtains the first address bundle as the control information from the address resolution server.

13. The communication terminal according to claim 1, further comprising a notifying device configured to obtain an upper side address of the router located between said communication terminal and another communication terminal, in response to a request from the other communication terminal,
wherein the other communication terminal belongs to a network on a lower side of the network to which said communication terminal belongs, the notifying device configured to notify the obtained upper side address to the other communication terminal.

14. A non-transitory computer readable recording medium having recorded thereon a computer program configured to control a computer provided for the communication terminal according to claim 1, said computer program making the computer function as said obtaining device, said recognizing device, and said determining device.

15. An address resolution server configured to transmit control information necessary for a communication terminal to communicate with another end terminal which belongs to a same network as a network to which the communication terminal belongs or which belongs to a network mutually connected via a router to the network to which the communication terminal belongs, by using a host name which is unique to the other end terminal, said address resolution server comprising:
a storing device configured to store an address bundle indicating a network route from a global network, to which said address resolution server belongs, to the other end terminal, the address bundle including a plurality of addresses; and a transmitting device configured to transmit the address bundle as the control information to the communication terminal in response to an address resolution request from the communication terminal which presents the host name of the other end terminal.

16. The address resolution server according to claim 15, wherein the address bundle includes an upper side host address or a lower side host address of the router which exists in the network route from the global network, to which said address resolution server belongs, to the other end terminal, and a host address of the other end terminal, in order of the network route.

17. A non-transitory computer readable recording medium having recorded thereon a computer program configured to control a computer provided for the address resolution server according to claim 15, said computer program making the computer function as said storing device and said transmitting device.

\* \* \* \* \*